(12) United States Patent
Schnitzler et al.

(10) Patent No.: US 10,377,658 B2
(45) Date of Patent: Aug. 13, 2019

(54) APPARATUSES AND METHODS FOR LASER PROCESSING

(71) Applicant: Corning Incorporated, Corning, NY (US)

(72) Inventors: Daniel Schnitzler, Bedburg (DE); Helmut Schillinger, München (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/657,320

(22) Filed: Jul. 24, 2017

(65) Prior Publication Data

US 2018/0029919 A1   Feb. 1, 2018

Related U.S. Application Data

(60) Provisional application No. 62/368,571, filed on Jul. 29, 2016.

(51) Int. Cl.
| | | |
|---|---|---|
| *C03B 33/02* | (2006.01) | |
| *B23K 26/00* | (2014.01) | |
| *B23K 26/53* | (2014.01) | |
| *B23K 26/073* | (2006.01) | |
| *B23K 26/08* | (2014.01) | |

(Continued)

(52) U.S. Cl.
CPC ...... *C03B 33/0222* (2013.01); *B23K 26/0006* (2013.01); *B23K 26/0624* (2015.10); *B23K 26/0734* (2013.01); *B23K 26/0738* (2013.01); *B23K 26/08* (2013.01); *B23K 26/53* (2015.10);
(Continued)

(58) Field of Classification Search
CPC .............. C03B 33/0222; C03B 33/091; B23K 26/0624; B23K 26/53; B23K 26/0006; B23K 26/0734; B23K 26/0738; B23K 26/08; B23K 2101/40; B23K 2103/54
See application file for complete search history.

(56) References Cited

U.S. PATENT DOCUMENTS

| | | |
|---|---|---|
| 1,790,397 A | 1/1931 | Woods et al. |
| 2,682,134 A | 6/1954 | Stookey |

(Continued)

FOREIGN PATENT DOCUMENTS

| | | |
|---|---|---|
| CN | 2388062 Y | 7/2000 |
| CN | 1283409 C | 11/2006 |

(Continued)

OTHER PUBLICATIONS

"What is the difference between Ra and RMS?"; Harrison Electropolishing LP; (http://www.harrisonep.com/electropolishingra.html), Accessed Aug. 8, 2016.

(Continued)

*Primary Examiner* — Queenie S Dehghan
(74) *Attorney, Agent, or Firm* — Robert L. Carlson

(57) ABSTRACT

A workpiece may be laser processed by a method that may include forming a contour line in the workpiece, and directing an infrared laser beam onto the workpiece along or near the contour line to separate the workpiece along the contour line. The contour line may include defects in the workpiece. The infrared laser beam may have a beam profile such that a greater distribution of cumulated energy from the infrared laser beam is located in areas adjacent to the contour line than directly on the contour line.

20 Claims, 14 Drawing Sheets

(51) Int. Cl.
*C03B 33/09* (2006.01)
*B23K 26/0622* (2014.01)
*B23K 103/00* (2006.01)
*B23K 101/40* (2006.01)

(52) U.S. Cl.
CPC ........ *C03B 33/091* (2013.01); *B23K 2101/40* (2018.08); *B23K 2103/54* (2018.08)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokayama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0021615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0021977 A1* | 2/2006 | Menegus ........... B23K 26/0738 219/121.69 |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Glukstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |

(56) References Cited

U.S. PATENT DOCUMENTS

| | | |
|---|---|---|
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0339207 A1* | 11/2014 | Sugiyama ............ B23K 26/38 219/121.72 |
| 2014/0361463 A1 | 12/2014 | Desimone et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0367442 A1 | 12/2015 | Bovatsek et al. |
| 2016/0008927 A1 | 1/2016 | Grundmueller et al. |
| 2016/0009066 A1 | 1/2016 | Neiber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |

(56) References Cited

FOREIGN PATENT DOCUMENTS

| | | |
|---|---|---|
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 104344202 A | 2/2015 |
| DE | 2231330 A1 | 1/1974 |
| DE | 10200635555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 298294 A1 | 10/2013 |
| GB | 1242172 | 8/1971 |
| JP | 1179770 A | 7/1989 |
| JP | 6318756 A | 11/1994 |
| JP | 09106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 2006130691 A | 5/2006 |
| JP | 2006248885 A | 9/2006 |
| JP | 2007021548 A | 2/2007 |
| JP | 2007253203 A | 10/2007 |
| JP | 2010046761 A | 3/2010 |
| JP | 04592855 B2 | 12/2010 |
| JP | 2011049398 A | 3/2011 |
| JP | 04672689 B2 | 4/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) Feb. 11, 2007.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, Aug. 11, 2002 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, Num. 15, p. 479 (1964).

(56) References Cited

OTHER PUBLICATIONS

Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens": Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al, "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps. pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
McGloin et al. "Bessel beams: diffraction in a new light" Contemporary Physics, vol. 46 No. 1 (2005) pp. 15-28.
Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).

(56) References Cited

OTHER PUBLICATIONS

Velpula et al.. "Ultrafast imaging of free carriers: controlled excitation with chirped ultrafast laser Bessel beams", Proc. of SPIE vol. 8967 896711-1 (2014).

Wang et al, "Investigation on CO2 laser irradiation inducing glass strip peeling for microchannel formation", Biomicrofluidics 6, 012820 (2012).

Wu et al. "Optimal orientation of the cutting head for enhancing smoothness movement in three-dimensional laser cutting" (2013) Zhongguo Jiguang/Chinese Journal of Lasers, 40 (1).

Xu et al. "Optimization of 3D laser cutting head orientation based on the minimum energy consumption" (2014) International Journal of Advanced Manufacturing Technology, 74 (9-12), pp. 1283-1291.

Yan et al. "Fiber structure to convert a Gaussian beam to higher-order optical orbital angular momentum modes" Optics Letters vol. 37 No. 16 (2012) pp. 3294-3296.

Yoshino et al., "Micromachining with a high repetition rate femtosecond fiber laser"; JLMN—Journal of Laser Micro/Nanoengineering vol. 3, No. 3 (2008), pp. 157-162.

Zeng et al. "Characteristic analysis of a refractive axicon system for optical trepanning"; Optical Engineering 45(9), 094302 (Sep. 2006), pp. 094302-1-094302-10.

Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

* cited by examiner

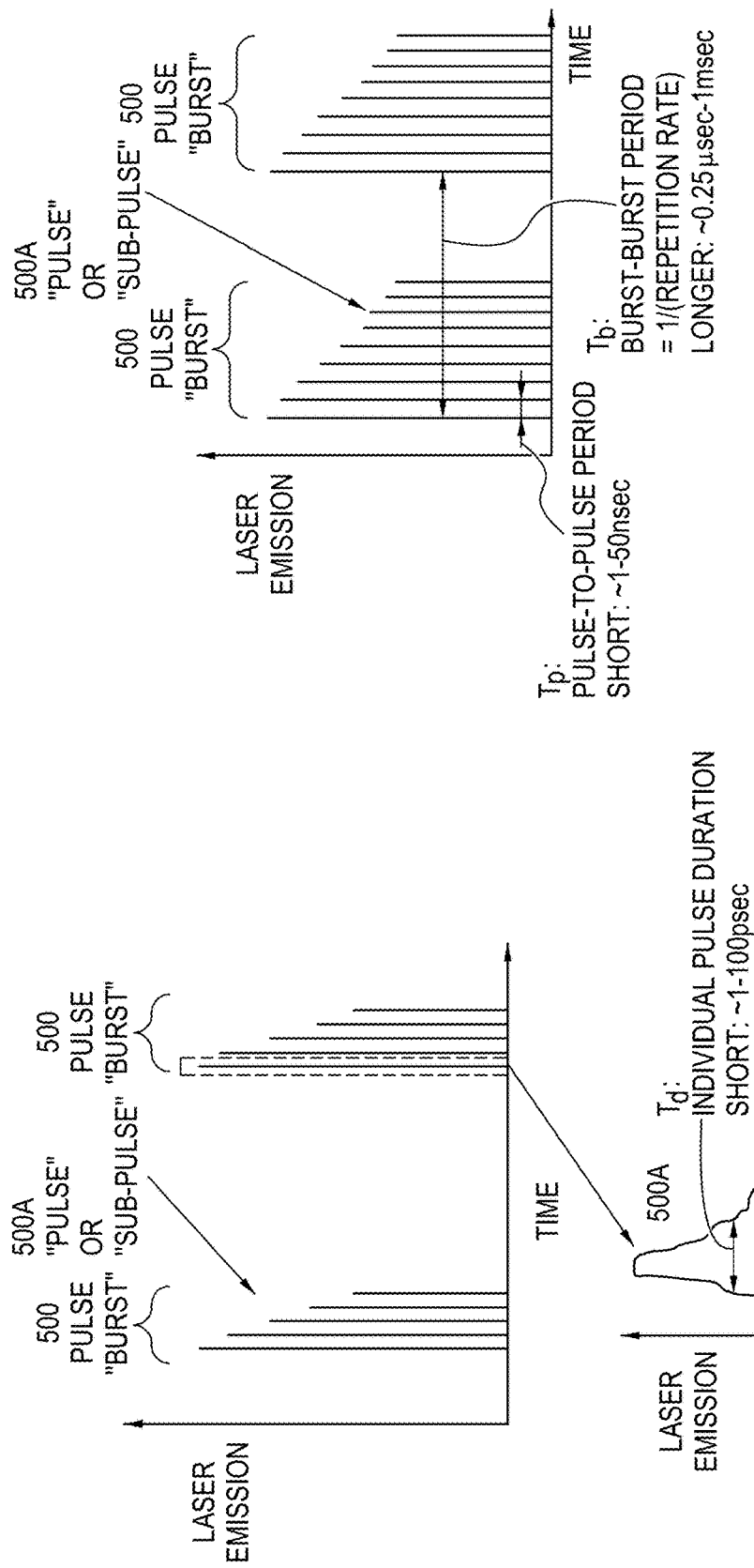

APPARATUSES AND METHODS FOR LASER PROCESSING

This application claims the benefit of priority under 35 U.S.C. § 119 of U.S. Provisional Application Ser. No. 62/368,571 filed on Jul. 29, 2016 the content of which is relied upon and incorporated herein by reference in its entirety.

BACKGROUND

Field

The present specification generally relates to apparatuses and methods for laser processing workpieces.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable and more reliable method of separating glass substrates than what is currently practiced in the market. Accordingly, a need exists for alternative improved methods for separating glass substrates.

SUMMARY

According to one embodiment, a workpiece may be laser processed by a method that may comprise forming a contour line in the workpiece, and directing an infrared laser beam onto the workpiece along or near the contour line to separate the workpiece along the contour line. The contour line may comprise defects in the workpiece. The workpiece in some embodiments may be a transparent workpiece. The infrared laser beam may have a beam profile such that a greater distribution of cumulated energy from the infrared laser beam is located in areas adjacent to the contour line than directly on the contour line. In some embodiments, the infrared laser beam may have an annular beam profile.

In another embodiment, a transparent workpiece may be laser processed by a method that may comprise focusing a pulsed laser beam into a pulsed laser beam focal line directed into the transparent workpiece, translating the transparent workpiece and the pulsed laser beam focal line relative to each other thereby laser forming a plurality of line defects along a contour line within the transparent workpiece, and directing an infrared laser beam onto the transparent workpiece along or near the contour line to separate the transparent workpiece along the contour line. The pulsed laser beam focal line may produce a line defect within the transparent workpiece. Spacing between adjacent line defects may be from 5 microns to 15 microns. The infrared laser beam may have a beam profile such that a greater distribution of cumulated energy from the infrared laser beam is located in areas adjacent to the contour line on both sides of the contour line than directly on the contour line.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8B-1 schematically depicts a first embodiment of a pulsed laser focal line in relationship to a transparent workpiece, according to one or more embodiments described herein;

FIG. 8B-2 schematically depicts a second embodiment of a pulsed laser focal line in relationship to a transparent workpiece, according to one or more embodiments described herein;

FIG. 8B-3 schematically depicts a third embodiment of a pulsed laser focal line in relationship to a transparent workpiece, according to one or more embodiments described herein;

FIG. 8B-4 schematically depicts a fourth embodiment of a pulsed laser focal line in relationship to a transparent workpiece, according to one or more embodiments described herein;

FIG. 13A graphically depicts the relative intensity of laser pulses within an exemplary pulse burst vs. time, with each exemplary pulse burst having 7 pulses, according to one or more embodiments described herein; and FIG. 13B graphically depicts relative intensity of laser pulses vs. time within an exemplary pulse burst, with each exemplary pulse burst containing 9 pulses, according to one or more embodiments described herein.

DETAILED DESCRIPTION

Figure 1:
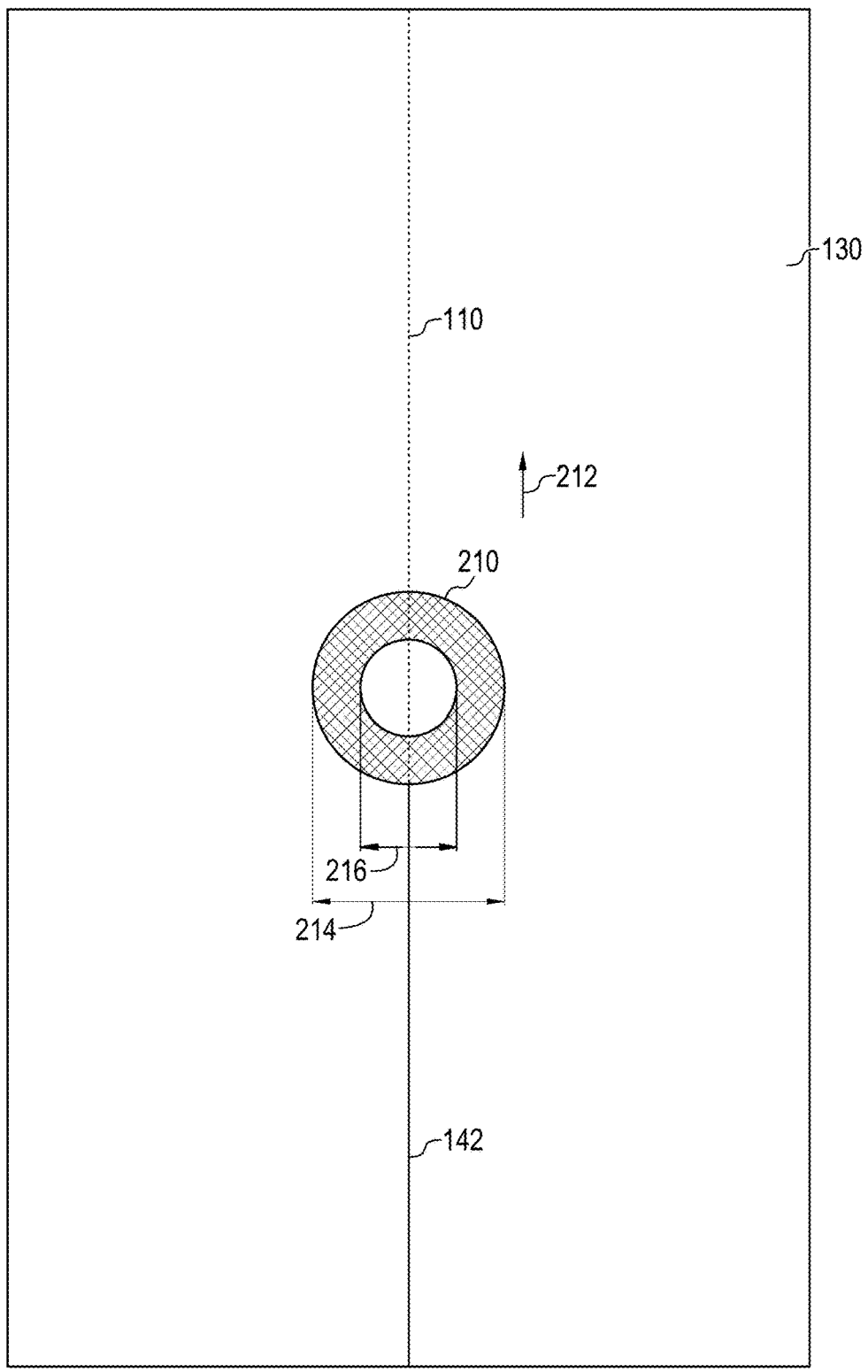
FIG. 1 schematically depicts an annular infrared laser beam spot traversing a contour line formed in a transparent workpiece, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to separate the transparent workpiece into two or more portions. Generally, the process involves at least a first step of forming a contour line comprising defects in the transparent workpiece, and a second step of separating the transparent workpiece along the contour line by subjecting the transparent workpiece to an infrared laser beam at or near the contour line. According to one embodiment, a pulsed laser beam may be utilized to create a series of line defects in the transparent workpiece thereby defining the contour line. These line defects may be referred to herein as perforations or nano-perforations in the transparent workpiece. The infrared laser may then be utilized to heat the area of the transparent workpiece adjacent to the contour line to separate the transparent workpiece at the contour line. Separation along the contour line may be caused by mechanical stresses in the in the transparent workpiece caused by differences in the temperature of the transparent workpiece at its different portions caused by the heating from the infrared laser beam. Various embodiments of methods and apparatuses for separating a transparent workpiece will be described herein with specific reference to the appended drawings.

The phrase "transparent workpiece," as used herein, means a workpiece formed from glass or glass-ceramic which are transparent, where the term "transparent," as used herein, means that the material exhibits an average transmission over a wavelength range of 400-700 nm which is greater than 40%. In some embodiments, the work piece may exhibit an average transmission over a wavelength range of 400-700 nm which is greater than 40%. According to some embodiments, at least a portion of the workpiece, such as the portion which is separated, has a coefficient of thermal expansion of less than about $5\times10^{-6}$/K, such as less than about $4\times10^{-6}$/K, or less than about $3.5\times10^{-6}$/K. For example, the workpiece may have a coefficient of thermal expansion of about $3.2\times10^{-6}$/K. The transparent workpiece may have a thickness of from about 50 microns to about 10 mm (such as from about 100 microns to about 5 mm, or from about 0.5 mm to about 3 mm.

The phrase "contour line," as used herein, denotes a line (e.g., a line, a curve, etc.) of intended separation on the surface of a workpiece along which a transparent workpiece will be separated into multiple portions upon exposure to the appropriate processing conditions. The contour line generally consists of one or more defects introduced into the transparent workpiece using various techniques. As used herein, a "defect" may include an area of modified material (relative to the bulk material), void space, scratch, flaw, hole, or other deformalities in the transparent workpiece which enables separation by an additional heat treatment, such as by infrared laser processing.

A transparent workpiece, such as a glass substrate or the like, may be separated into multiple portions by first forming a contour line on the surface of the workpiece and, thereafter, heating the surface of the workpiece on the contour line to create thermal stresses in the workpiece. The stresses ultimately lead to the spontaneous separation of the workpiece along the contour line. Heating the surface of the workpiece may be carried out, for example, using an infrared laser. Specifically, conventional infrared laser processing to induce separation along a contour line utilizes an infrared laser beam directed incident on the contour line with a profile which causes maximum heat intensity directly onto the defects defining the contour line. For example, a Gaussian beam profile may be conventionally utilized and centered directly on the contour line. In such conventional processes, the maximum intensity of laser energy, as well as heat, is at the contour line. However, it has been discovered that utilizing an infrared laser beam with a peak intensity on the contour line (which has sufficient energy to cause separation) may cause damage to the edges of the separated transparent workpieces where the contour line existed prior to separation. For example, for some glass compositions which require relatively high powered infrared lasers for separation, heat cracks may propagate from the separated edge in a direction generally perpendicular to the edge of the separated transparent workpiece (i.e., generally perpendicular to the intended line of separation denoted by the contour line) which weaken the edges of separated transparent workpiece.

Further, the spontaneous separation following heating of the contour line is related to the coefficient of thermal expansion (CTE) of the material of the transparent workpiece, with materials having relatively high CTEs being more amenable to spontaneous separation upon heating than materials with relatively low CTEs. In situations where the transparent workpiece is formed from a material having a relatively low CTE, spontaneous separation along the contour line may be facilitated by increasing the thermal energy imparted to the transparent workpiece. However, under certain conditions (e.g., when the CTE of the material is extremely low), by conventional means, it may not be possible to increase the thermal energy imparted to the transparent workpiece without damaging (e.g., melting) the workpiece, rendering the workpiece unviable.

For example, in some embodiments of conventional infrared laser processing, if the spot size is too small (e.g., less than 1 mm), or the $CO_2$ laser power is too high (e.g., greater than 400 W), the transparent workpiece may be over heated at the contour line, creating ablation, melting, and/or thermally generated cracks in the transparent workpiece, which are undesirable, as they will reduce the edge strength of the separated parts. Such parameters may be unavoidable under conventional processing by Gaussian beam profiles, particularly on transparent substrates such as glass with a relatively low CTE (e.g., less than about $4 \times 10^{-6}$/K), these high intensity laser parameters may be necessary to cause separation of the transparent workpiece by crack propagation along the contour line when a Gaussian laser profile is utilized. Thus, by conventional means, it may be challenging or even unavoidable to separate low CTE glass workpieces without causing undesirable effects such as ablation, melting, and/or thermally generated cracking.

The above-described deficiencies of conventional infrared laser processing may be overcome by utilizing an infrared laser beam profile which has a greater distribution of cumulated energy from the infrared laser beam located in areas adjacent to the contour line than directly on the contour line. That is, the infrared laser beam may transfer more energy onto areas adjacent to the contour line than directly onto the contour line. As used herein, "cumulated energy" refers to all energy transferred onto a particular area of a workpiece by the infrared laser beam as the laser beam is translated with respect to the workpiece. For example, in one embodiment, the infrared laser separation may utilize an annular laser beam profile. The annular laser beam may be centered on the contour line but project greater amounts of energy onto the areas adjacent to the contour line than directly onto the contour line. With such a beam profile, greater total amounts of thermal energy may be applied to the transparent workpiece without causing heat cracks and/or melting due to overheating at the contour line.

Referring now to FIG. 1 by way of example, a transparent workpiece 130, such as a glass workpiece or a glass-ceramic workpiece, is schematically depicted undergoing separation according to the methods described herein. Initially, a contour line 110 is formed in a surface of the transparent workpiece 130 to delineate the line of intended separation about which the transparent workpiece will be separated into two or more portions. The contour line 110 may be outlined by a series of defects in the transparent workpiece 130. While the contour line 110 is depicted in FIG. 1 as being substantially linear, it should be understood that other configurations are contemplated and possible including, without limitation, curves, patterns, regular geometric shapes, irregular shapes, and the like. As noted herein, the contour line 110 includes defects which may be further acted upon to induce spontaneous separation of the transparent workpiece 130 along the contour line 110. According to embodiments, the defects of the contour line 110 may be formed by a number of methods, including laser processing, mechanical processing, or combinations thereof. For example, the contour line 110 may be formed by laser scribing or mechanical scoring. In one embodiment, a silicon carbide wheel or scribing tool or a diamond-tipped scribing tool may be used to form the contour line 110 and the defects contained therein. In another embodiment, a laser processing technique may be utilized to form the defects of the contour line 110 in the transparent workpiece 130. For example, in embodiments, the methods and apparatuses for forming a "perforated" contour line as disclosed in U.S. Patent Application Publication No. 2015/0360991, published Dec. 17, 2015 and incorporated herein by reference in its entirety, may be used to form the contour line 110 in the transparent workpiece 130.

According to the methods described in U.S. Patent Application Publication No. 2015/0360991, the contour line 110 may comprise line shaped defects, referred to herein as "line defects," that extend into the surface of the workpiece 130 and delineate the desired shape of the separated workpiece and establish a path for crack propagation and, hence, separation of the shape workpiece into separate portions along the contour line 110. To form the contour line 110, the transparent workpiece 130 to be processed may be irradiated with an ultra-short pulsed (i.e., having a pulse width less than 100 psec) laser beam at wavelengths at or below 1064 nm that is condensed into a high aspect ratio line focus that penetrates through at least a portion of the thickness of the transparent workpiece 130. Within this volume of high energy density, the material of the transparent workpiece 130 along the contour line 110 is modified via nonlinear effects (e.g., by two photon absorption), specifically creating defects in the material of the transparent workpiece 130. By scanning the laser over a desired line or path, narrow line defects (e.g., a few microns wide) defining the contour line 110 may be formed. This contour line 110 may define the perimeter or shape to be separated from the transparent workpiece 130 in a subsequent heating step.

Still referring to FIG. 1, following the formation of the contour line 110 in the transparent workpiece 130, a thermal source, such as an infrared laser beam, may be utilized to separate the transparent workpiece 130 along the contour line 110. According to embodiments, the thermal source may be used to create thermal stress and thereby separate the transparent workpiece 130 at the contour line 110. In embodiments, an infrared laser may be used to initiate spontaneous separation and then the separation may be finished mechanically.

The infrared laser beam, such as a laser beam produced by a carbon dioxide laser (a "$CO_2$ laser"), a carbon monoxide laser (a "CO laser"), a solid state laser, a laser diode, or combinations thereof, is a controlled heat source that rapidly increases the temperature of the transparent workpiece 130 at or near the contour line 110. This rapid heating may build compressive stress in the transparent workpiece 130 on or adjacent to the contour line 110. Since the area of the heated glass surface is relatively small compared to the overall surface area of the transparent workpiece 130, the heated area cools relatively rapidly. The resultant temperature gradient induces tensile stress in the transparent workpiece 130 sufficient to propagate a crack along the contour line 110 and through the thickness of the transparent workpiece 130, resulting in full separation of the transparent workpiece 130 along the contour line 110. Without being bound by theory, it is believed that the tensile stress may be caused by expansion of the glass (i.e., changed density) in portions of the workpiece with higher local temperature.

Still referring to FIG. 1, in the embodiments described herein, an infrared laser beam (with a beam spot 210 projected onto the transparent workpiece 130) may be directed onto the transparent workpiece 130 and translated relative to the transparent workpiece 130 along the contour line 110 in a processing direction 212. It should be understood that the "beam spot 210" may in some cases be referred to interchangeably as the "infrared laser beam 21" with reference to FIG. 1, as the beam spot 210 depicted is the area of the workpiece 130 contacted by the infrared laser beam. Separated portion 142 of the contour line 110 is formed by heating the contour line 110 with the infrared laser beam (e.g., by traversing beam spot 210), thereby causing a crack to propagate along the contour line 110 and through its thickness causing spontaneous separation to occur. The separated portion 142 of the contour line 110 trails the beam spot 210 as it moves in the processing direction 212. According to one or more embodiments, the infrared laser beam may be translated across the transparent workpiece 130 by motion of the transparent workpiece 130, motion of the infrared laser beam (i.e., motion of the beam spot 210), or motion of both the transparent workpiece 130 and the infrared laser beam. By translating the infrared laser beam spot 210 relative to the transparent workpiece 130, the transparent workpiece 130 may be separated along the contour line 110 containing defects.

According to embodiments described herein, the infrared laser beam spot 210 may be projected at or near the contour line 110 and transfer a greater amount of energy onto the areas of the transparent workpiece 130 adjacent to both sides of the contour line 110 than directly onto the contour line 110. The areas "adjacent" to the contour line 110 include any areas of the transparent workpiece 130 on both sides of the contour line 110 (i.e., any area which does not include the line of defects). Heating the transparent workpiece 130 on both sides of the contour line 110 creates the thermal stress to facilitate spontaneous separation of the transparent workpiece 130 along the contour line 110. However, while the total amount of energy imparted to the transparent workpiece 130 to facilitate spontaneous separation along the contour line 110 may be the same as if the infrared laser beam 210 was focused with maximum intensity directly on the contour line 110 (e.g., a Gaussian beam profile), heating the transparent workpiece on both sides of the contour line 110 rather than with maximum intensity directly on the contour line 110 spreads the total amount of thermal energy over a larger area, thereby mitigating the formation of cracks lateral to the contour line 110 due to overheating and also reducing or even mitigating melting of the material of the transparent workpiece 130 adjacent to or at the contour line 110. Indeed, heating the transparent workpiece 130 with maximum intensity on both sides of the contour line 110 rather than with maximum intensity directly on the contour line 110 may actually allow for a greater amount of total thermal energy to be introduced into the transparent workpiece 130 without the formation of undesired lateral cracks and/or melting, thereby enabling laser separation of transparent workpieces 130 formed from materials having relatively low CTEs.

Figure 2:
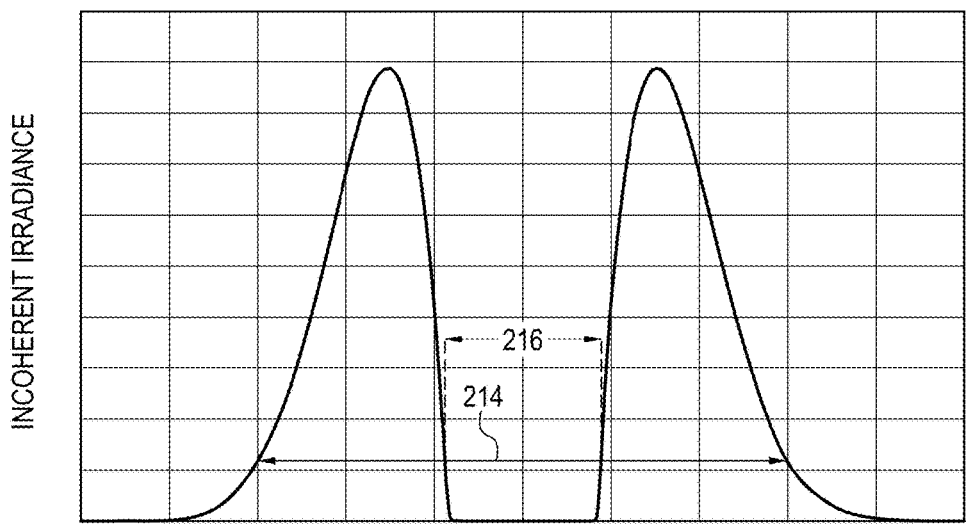
FIG. 2 graphically depicts the cross-sectional power distribution of an embodiment of an annular infrared laser beam, according to one or more embodiments described herein.

In some embodiments, the infrared laser beam 210 used to facilitate spontaneous separation may comprise an annular beam profile, such as the circular symmetric annular beam profile depicted in FIG. 1, in order to transfer a greater amount of energy onto the areas adjacent the contour line 110 than directly onto the contour line 110. FIG. 2 graphically depicts the energy distribution of the annular beam as a function of beam diameter. As used herein, an annular beam profile refers to any laser beam profile which generally has a maximum intensity away from the center of the beam and has an intensity trough at its center relative to the maximum intensity. The trough may include complete lack of energy at the center of the beam, such as shown in the example beam profile of FIG. 2 (i.e. the intensity of the beam is 0 at its center). For example, in embodiments a beam spot of a laser beam with an annular beam profile has an inner diameter 216 and an outer diameter 214 as depicted in FIGS. 1 and 2. The inner diameter 216 defines a central region of the beam spot which is generally lower in intensity than the area between the inner diameter 216 and the outer diameter 214.

While reference has been made herein to the use of an annular beam 210 which is circular symmetric relative to the contour line 110 to facilitate heating the transparent workpiece 130 on both sides of the contour line 110, it should be understood that other configurations of beams are contemplated and possible so long as the beam has a profile in which the maximum intensity is not concentric with the center of the beam. For example, the annular beam profile could be an elliptical shape.

As depicted in FIG. 1, the infrared laser beam 210 may be centered on the contour line 110 such that equal amounts of thermal energy are projected onto each side of the contour line 110. In such an embodiment, the infrared laser beam 210 will transfer more thermal energy onto adjacent areas on both sides of the contour line 110 than directly onto the contour line 110. It should be understood that the infrared laser beam 210 of FIG. 1 is schematic in nature, and is one representation of an annular beam profile such as that depicted in FIG. 2.

As described herein, the infrared laser beam 210 having an annular profile may comprise an inner diameter 216 and an outer diameter 214. According to embodiments, the inner diameter 216 is defined as twice the distance from the center of the beam (i.e., 2 times a radius) where 86% of the beam energy is outside of that distance. Similarly, the outer diameter 214 is defined as twice the distance from the center of the beam (i.e., 2 times a radius) where 86% of the beam energy is inside of that distance. As such, some beam energy is present outside of the area between the inner diameter 216 and the outer diameter 214. According to embodiments, the outer diameter 214 may be from about 0.5 mm to about 20 mm, such as from about 1 mm to about 10 mm, from about 2 mm to about 8 mm, or from about 3 mm to about 6 mm. The inner diameter 216 may be from about 0.01 mm to about 10 mm, from about 0.1 mm to about 10 mm, or from about 0.7 mm to about 3 mm. For example, the inner diameter 216 may be from about 5% to about 95% of the outer diameter 214, such as from about 10% to about 50%, from about 20% to about 45%, or from about 30% to about 40% of the outer diameter 214. According to some embodiments, the maximum power from the infrared laser beam 210 (as well as maximum temperature in the transparent workpiece 130) may be at a distance from the contour line 110 about equal to about the half the inner diameter 216.

Figure 3:
FIG. 3 schematically depicts an optics assembly utilized to form an annular infrared laser beam profile, according to one or more embodiments described herein.

According to one embodiment, an annular beam profile may be produced with the optical assembly depicted in FIG. 3. An incoming Gaussian beam 302 from, for example a $CO_2$ laser 330 or the like, may be directed through an axicon lens 310 and, thereafter, a first plano-convex lens 312 and a second plano-convex lens 314. According to one or more embodiments, the Gaussian beam 302 may have a diameter of from about 8 mm to about 10 mm (according to its $1/e^2$ diameter), and the axicon lens 310 may have a conical surface having an angle of about 1.2°, such as from about 0.5° to about 5°, or from about 1° to about 1.5°, or even from about 0.5° to about 5° (the angle measured relative to the flat surface upon which the beam enters the axicon. The axicon lens 310 shapes the incoming Gaussian beam 302 into a Bessel beam which, in turn, is directed through the first plano-convex lens 312 and the second plano-convex lens 314. The first plano-convex lens 312 and second plano-convex lens 314 collimate the Bessel beam and adjust the diameter(s) of the annual spot of the Bessel beam. In embodiments, the first plano-convex lens 312 may have a focal length of from about 50 mm to about 200 mm (such as from about 50 mm to about 150 mm, or from about 75 mm to about 100 mm), and the second plano-convex lens 314 may have a focal length less than that of the first plano-convex lens, such as from about 25 mm to about 50 mm. The resulting annular infrared laser beam 316 is projected onto the transparent workpiece 130 along the contour line 110.

While FIG. 3 schematically depicts one optical assembly for generating an annular laser beam, it should be understood that other optical assemblies for generating an annular laser beam are contemplated and possible and, as such, the separation processes described herein are not limited to the optical assembly depicted in FIG. 3.

A separation process which utilizes an infrared laser beam which projects its maximum power away from the contour line 110 may allow for more total power to be imparted to the transparent workpiece without causing damage to the separated surfaces and/or edges from excessive localized heating. The additional power may cause more thermal stress within the transparent workpiece, which may enable separation of low CTE materials, thicker workpieces, and/or stacks of workpieces without damaging the workpieces.

The embodiments described herein may also enable faster processing speeds in separating the transparent workpiece. For example, the infrared laser beam and the transparent workpiece may be translated relative to one another at a speed of at least about 1 mm/s, at least about 5 mm/s, at least about 10 mm/s, at least about 100 mm/s, at least about 1 m/s, at least about 2 mm/s, at least about 5 m/s, or even at least about 10 m/s (such as from about 1 mm/s to about 10 m/s, or from about 10 mm/s to about 2 m/s). In general, faster processing speeds require greater amounts of laser power to achieve the thermal stresses to facilitate spontaneous separation. As noted above, greater laser power can damage the transparent workpiece in conventional separation techniques. However, with the energy concentration distributed away from the contour line in the embodiments described herein, overheating may be avoided which may reduce or eliminate unwanted damage in the transparent workpiece.

Figure 4A:
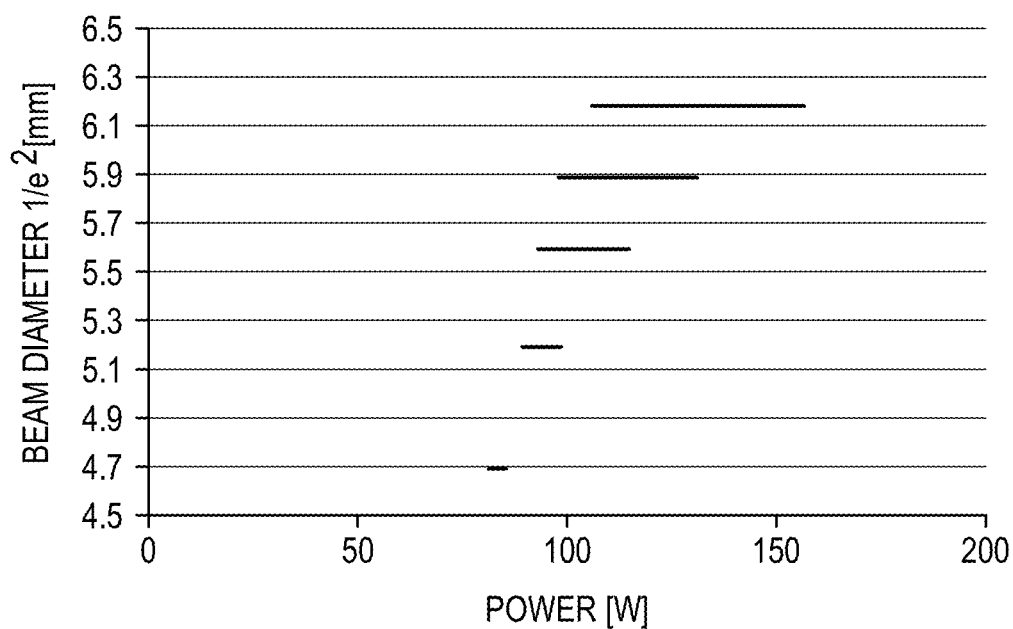
FIG. 4A graphically depicts the beam diameter of the infrared laser beam as a function of suitable power for a conventional Gaussian infrared laser beam laser profile, according to one or more embodiments described herein.
Figure 4B:
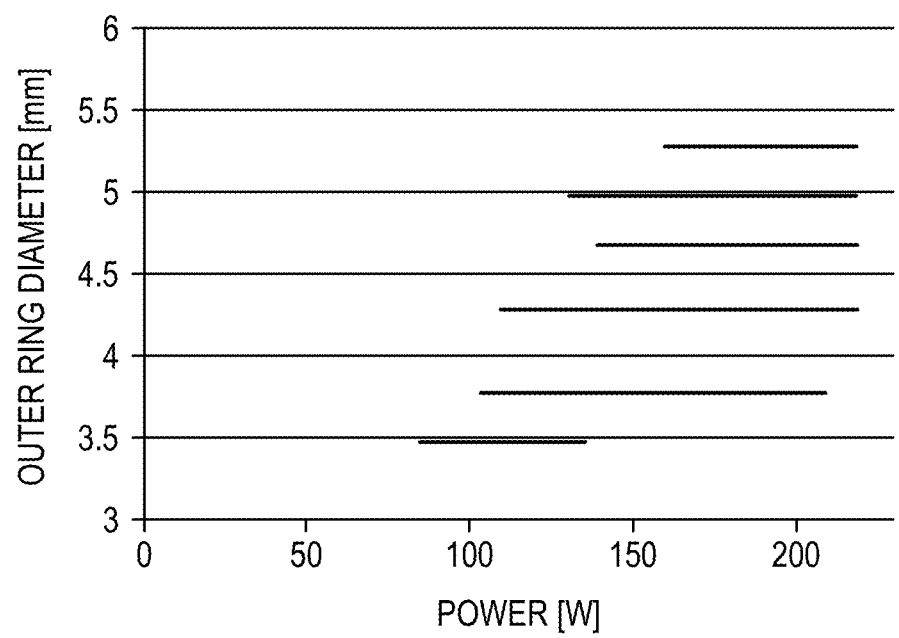
FIG. 4B graphically depicts the beam diameter of the infrared laser beam as a function of suitable power for an annular infrared laser beam profile, according to one or more embodiments described herein.
Figure 5:
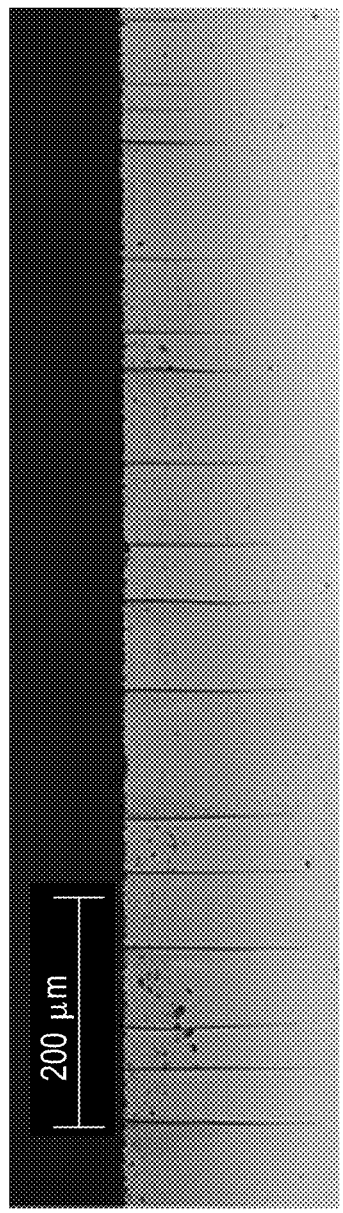
FIG. 5 depicts an image of the side of a separated transparent workpiece at the point of separation, and shows cracks caused by excessive heating by a conventional laser treatment utilizing a Gaussian infrared laser beam at the contour line, according to one or more embodiments described herein.

In embodiments, the process of separating the transparent workpiece by infrared laser beam processing as described herein may allow for a greater window of power to be utilized for a given process speed. For example, the data of FIG. 4A represents the conventional separation technique utilizing a Gaussian infrared laser beam projected onto a transparent workpiece at a speed of 200 mm/s, where the beam diameter (i.e., the $1/e^2$ diameter) is graphically depicted as a function of beam power sufficient for separation. FIG. 4B represents an annular infrared laser beam as described herein projected onto a transparent workpiece at a speed of 200 mm/s, where the outer beam diameter is graphically depicted as a function of suitable beam power. As can be seen in FIGS. 4A and 4B, the infrared beam power range which is suitable for separating the transparent workpiece (i.e., causing spontaneous separation without causing damage to the transparent workpiece such as the laterally cracking depicted in FIG. 5) is broader utilizing the annular beam rather than the Gaussian beam of the conventional process. Thus, for a given processing speed, the power of the infrared laser beam may be more widely varied using the annular beam profile, allowing for more flexibility in processing. According to embodiments, the infrared laser beam may have a power of from about 20 W to about 1000 W, such as from about 50 W to about 300 W, or from about 75 W to about 200 W, and sub ranges of power and relative to outer diameter as depicted in FIG. 4B.

Referring now to FIGS. 1 and 3, one embodiment for separating a transparent workpiece 130 includes an initial step of forming a contour line 110 on the surface of the glass workpiece 130. The contour line 110 defines the intended line of separation and generally includes defects which, when further operated on such as by heating or the like, cause spontaneous separation of the transparent workpiece 130 along the contour line 110. In a second step following forming of the contour line 110, an annular laser beam 210 from an infrared laser is directed onto the surface of the glass workpiece 130 along the contour line. In embodiments, the annular laser beam 210 may be formed by directing an initial Gaussian-shaped beam of, for example, a $CO_2$ laser through an axicon lens 310, a first plano-convex lens 312, and a second plano-convex lens 314 as depicted in FIG. 3 to facilitate shaping the Gaussian-shaped beam into a Bessel beam having a beam spot with an annular profile as depicted in FIG. 1 and an annular energy distribution as depicted in FIG. 2. In the embodiment of the separation process depicted in FIG. 1, the resultant annular laser beam 210 has a profile which is generally circular symmetric (i.e., an annulus or ring).

The annular laser beam 210 is positioned on the surface of the transparent workpiece 130 such that the contour line 110 generally bisects the annular laser beam 210. That is, the annular laser beam 210 is positioned on the surface of the transparent workpiece 130 such that the contour line 110 lies along a diameter of the annular laser beam 210. The annular laser beam 210 is then traversed over the contour line 110 by moving the annular laser beam 210 relative to the workpiece 130, moving the workpiece 130 relative to the annular laser beam 210, or moving the annular laser beam 210 and the workpiece 130 relative to one another.

As noted hereinabove, the annular laser beam 210 imparts thermal energy to the transparent workpiece 130 along the contour line 110. In the embodiments described herein, the maximum amount of thermal energy imparted to the transparent workpiece 130 is not directly on the contour line 110, but rather in areas of the transparent workpiece 130 laterally offset and spaced apart from the contour line 110 which mitigates unintended damage to the transparent workpiece 130 such as melting and/or laterally cracking. As the annular laser beam 210 traverses the contour line 110, the annular laser beam 210 heats up the material of the transparent workpiece 130 causing expansion of the material. This results in the development of compressive stress in the heated areas while tensile stresses develop along the contour line 110 ahead of and behind the annular laser beam 210. These stresses cause the contour line 110 and, more specifically, the defects of the contour line 110 to spontaneously propagate both through the thickness of the transparent workpiece 130 and along the contour line 110 resulting in the spontaneous separation of the transparent workpiece 130 along the contour line 110.

According to one or more embodiments, the present disclosure provides a process for precision cutting and/or separation of transparent workpieces such as, for example, glass workpieces formed from alkaline earth boro-aluminosilicate glass compositions, sapphire, fused silica, or combinations thereof. Such transparent workpieces may be utilized as display and/or TFT (thin film transistor) substrates. Some examples of such glasses or glass compositions suitable for display or TFT use are EAGLE XG®, CONTEGO, and CORNING LOTUS™ available from Corning Incorporated of Corning, N.Y. The alkaline earth boro-aluminosilicate glass compositions may be formulated to be suitable for use as substrates for electronic applications including, without limitation, substrates for TFTs. The glass compositions used in conjunction with TFTs typically have coefficients of thermal expansion (CTE) similar to that of silicon (such as less than $5 \times 10^{-6}$/K, or even less than $4 \times 10^{-6}$/K, for example, approximately $3 \times 10^{-6}$/K, or about $2.5 \times 10^{-6}$/K to about $3.5 \times 10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable. According to embodiments, the laser cutting processes described herein may be used to separate transparent workpieces in a controlled fashion with negligible debris, minimum defects, and low subsurface damage to the edges, preserving workpiece integrity and strength.

As described above, according to some embodiments, the contour line may comprise line defects (sometimes referred to herein as perforations) produced by interaction of the transparent workpiece with a pulsed laser beam, such as is described in U.S. Publication No. 2015/0360991. This method utilizing a pulsed laser to form defects in the transparent workpiece may be well suited for materials that are transparent to the selected pulsed laser wavelength. This pulsed laser wavelength may be, for example, 1064 nm, 532 nm, 355 nm, or 266 nm. Demonstrations of the method for forming the contour line of defects have been made, for example, by using EAGLE XG® compositions in thicknesses ranging from 0.025 mm to 0.7 mm.

The pulsed laser beam may create multi-photon absorption (MPA) in substantially transparent materials such as glass workpieces. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour line may utilize an ultra-short pulse laser in combination with optics that generate a focal line to fully perforate a transparent workpiece formed from, for example, various glass compositions. In some embodiments, the pulse duration of the individual pulses is in a range of from about 1 picosecond to about 100 picoseconds, such as from about 5 picoseconds to about 20 picoseconds, and the repetition rate of the individual pulses may be in a range from about 1 kHz to 4 MHz, such as in a range from about 10 kHz to about 3 MHz, or from about 10 kHz to about 650 kHz.

In addition to a single pulse operation at the aforementioned individual pulse repetition rates, the pulses may be produced in bursts of two pulses or more (such as, for example, 3 pulses, 4 pulses, 5 pulses, 10 pulses, 15 pulses, 20 pulses, or more per pulse burst, such as from 1 to 30 pulses per pulse burst, or from 5 to 20 pulses per pulse burst). The pulses within the burst may be separated by a duration that is in a range from about 1 nsec to about 50 nsec, for example, from about 10 nsec to about 30 nsec, such as about 20 nsec. The burst repetition frequency may be in a range of from about 1 kHz to about 2 MHz, such as from about 1 kHz to about 200 kHz. Bursting or producing pulse bursts is a type of laser operation where the emission of pulses is not in a uniform and steady stream but rather in tight clusters of pulses. The pulse burst laser beam may have a wavelength selected based on the material of the transparent workpiece being operated on such that the material of the transparent workpiece is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The transparent workpiece may be translated relative to the pulsed laser beam (or the pulsed laser beam may be translated relative to the glass) to create contour lines that trace out the shape of a desired part with defects. The pulsed laser may create hole-like defect zones, referred to herein as line defects, that may penetrate the full depth of the glass. It should be understood that while sometimes described as "holes" or "hole-like," the defects disclosed herein may generally not be void spaces, but are rather portions of the workpiece which has been modified by laser processing as described herein. In display or TFT type glasses these line defects may generally be spaced apart from one another by a distance of from about 5 microns to about 20 microns. For example, suitable spacing between the line defects may be from about 1 microns to about 30 microns, such as from about 5 microns to about 15 microns, from about 5 microns to about 12 microns, from about 7 microns to about 15 microns, or from about 7 microns to about 12 microns for the TFT/display glass compositions).

As defined herein, the internal diameter of a line defect is the internal diameter of the modified area defining the line defect in the transparent workpiece. For example, in some embodiments described herein, the internal diameter of the line defect may be less than or equal to about 1 micron, for example, less than or equal to about 500 nm, less than or equal to about 400 nm, or even less than or equal to about 300 nm. In embodiments, the internal diameter of a line defects may be as large as the spot diameter of the laser beam focal line. In embodiments, the pulsed laser beam focal line may have an average spot diameter in a range of from about 0.1 micron to about 30 microns, such as from about 0.1 microns to about 10 microns, from about 0.1 microns to about 5 microns, for example, from about 1.5 microns to about 3.5 microns. Once a workpiece is separated along the contour line, the line defects may potentially still be observable at the separated surface and may have a width comparable to the internal diameters of the line defects. Thus, widths of line defects on a cut surface of a workpiece prepared by embodiments of methods described herein may have widths of from about 0.1 micron to about 5 microns.

Beyond the perforation of a single transparent workpiece, the process may also be used to perforate stacks of transparent workpieces, such as stacks of sheets of glass, and may fully perforate glass stacks of up to a few mm total height with a single laser pass. The glass stacks additionally may have air gaps in various locations. According to another embodiment, ductile layers such as adhesives may be disposed between the glass stacks. However, the pulsed laser process will still, in a single pass, fully perforate both the upper and lower glass layers of such a stack.

Without being bound by theory, it is believed that one of the enablers of the described perforation process is the high aspect ratio of the line defects created by the ultra-short pulsed laser. This high aspect ratio allows creation of a contour line that extends, in some embodiments, from the top to the bottom surfaces of the workpiece to be cut. In principle, this line defect may be created by a single pulse and if necessary, additional pulses may be used to increase the extension of the affected area (depth and width).

In embodiments, the pulsed laser beam focal line may have a length in a range of from about 0.1 mm to about 10 mm, or from about 0.5 mm to about 5 mm, for example, about 1 mm, about 2 mm, about 3 mm, about 4 mm, about 5 mm, about 6 mm, about 7 mm, about 8 mm, or about 9 mm, or a length in a range of from about 0.1 mm to about 2 mm, or from 0.1 mm to about 1 mm. In embodiments, the pulsed laser beam focal line may have an average spot diameter in a range of from about 0.1 micron to about 5 microns. The line defects each may have a diameter of from about 0.1 microns to 30 microns, for example, from about 0.25 microns to about 5 microns (e.g., from about 0.25 microns to about 0.75 microns).

The generation of a focal line may be performed by sending a Gaussian laser beam into an axicon lens, in which case a beam profile known as a Gauss-Bessel beam is created. Such a beam diffracts much more slowly (e.g., the beam may maintain single micron diameter spot sizes for ranges of hundreds of microns or millimeters as opposed to a few tens of microns or less) than a Gaussian beam. Hence the depth of focus or length of intense interaction with the material may be much larger than when using a Gaussian beam only. Other forms of slowly diffracting or non-diffracting beams may also be used, such as Airy beams.

Figure 6:
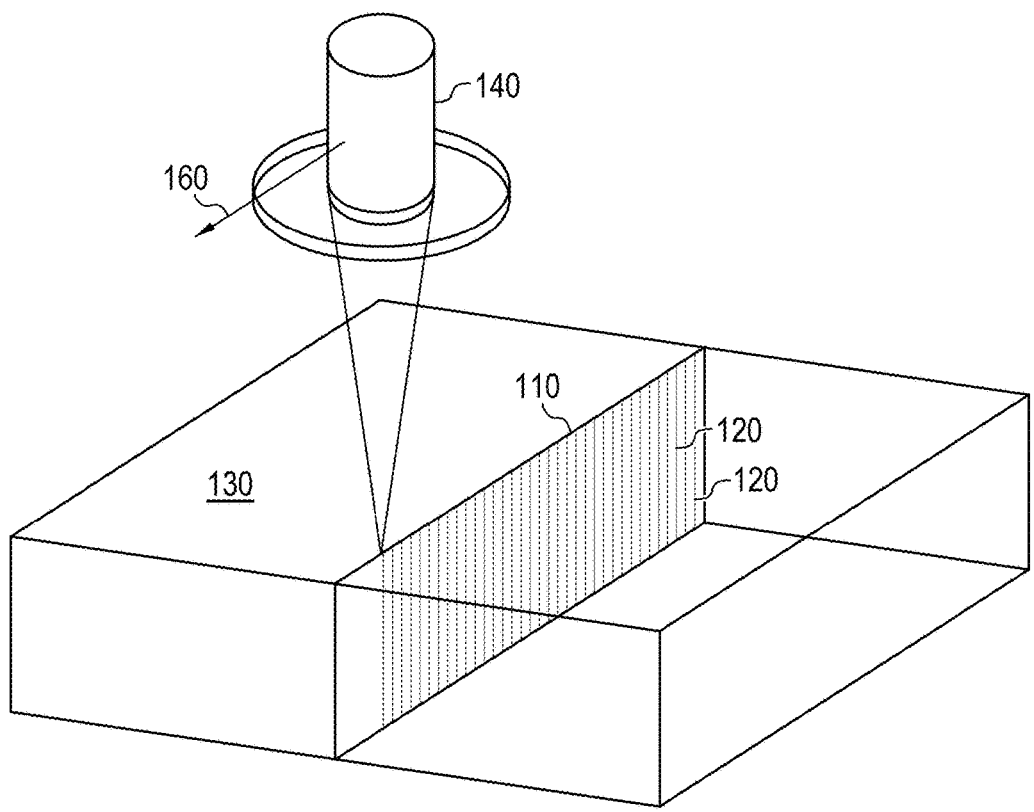
FIG. 6 schematically depicts the formation of a contour line of line defects according to one or more embodiments described herein.

As illustrated in FIG. 6, a contour line 110 comprising a plurality of line defects 120 may be formed by processing the transparent workpiece 130 with an ultra-short pulsed laser beam 140 moving in processing direction 160. The line defects 120 may extend, for example, through the thickness of the transparent workpiece 130, and may be orthogonal to the major (flat) surfaces of the transparent workpiece 130. While contour lines may be linear, like the contour line 110 illustrated in FIG. 6, the contours lines may also be nonlinear (i.e., having a curvature). Curved contour lines may be produced, for example, by translating either the transparent workpiece 130 or pulsed laser beam 140 with respect to the other in two dimensions instead of one dimension. While in some transparent workpieces the material properties (e.g., absorption, CTE, stress, composition, etc.) and pulsed laser parameters chosen for processing the transparent workpiece may alone induce self-separation, in the embodiments described herein, a heat treatment (e.g., with an infrared laser) is utilized to separate the transparent workpiece 130 at the contour line 110 following formation of the contour line 110. As illustrated in FIG. 6, a plurality of line defects 120 may define the contour line 110.

For some transparent workpieces, the distance, or periodicity, between adjacent line defects 120 along the direction of the contour lines 110 may be at least about 0.1 micron or 1 micron and less than or equal to about 20 microns or even 30 microns. For example, in some transparent workpieces, the periodicity between adjacent line defects 120 may be from about 0.5 to about 15 microns, or from about 3 microns to about 10 microns, or from about 0.5 microns to about 3.0 microns. For example, in some transparent workpieces the periodicity between adjacent line defects 120 may be from about 0.5 micron to about 1.0 micron. However for alkaline earth boro-aluminosilicate glass compositions, especially those 0.5 mm thick or of greater thickness, the periodicity between adjacent line defects 120 may be at least about 1 microns, such as at least about 5 microns, or from about 1 microns to about 15 microns.

According to various embodiments, there are several methods to create a perforated contour line by processing with a pulsed laser beam. The optical method of forming the focal line may take multiple forms, using donut shaped laser beams and spherical lenses, axicon lenses, diffractive elements, or other methods to form the linear region of high intensity. The type of laser (picosecond, femtosecond, etc.) and wavelength (infrared, green, UV, etc.) may also be varied, as long as sufficient optical intensities are reached to create breakdown of the workpiece material in the region of focus on the transparent workpiece through nonlinear optical effects. According to one or more embodiments, the laser may be a pulse burst laser which allows for control of the energy deposition with time by adjusting the number of pulses within a given burst.

In the present embodiments, an ultra-short pulsed laser may be used to create a high aspect ratio vertical line defect in a consistent, controllable, and repeatable manner. According to one embodiment, optical techniques are used to create a line focus of a high intensity laser beam within a transparent workpiece. In one embodiment, an axicon lens element is used in an optical lens assembly to create a region of high aspect ratio, taper-free line defects using ultra-short (picoseconds or femtosecond duration) Bessel beams. In other words, the axicon condenses the laser beam into a high intensity region of cylindrical shape and high aspect ratio (long length and small diameter). Due to the high intensity created with the condensed laser beam, nonlinear interaction of the electromagnetic field of the laser and the workpiece material may occur and the laser energy may be transferred to the workpiece to effect formation of defects that become constituents of the contour line. However, it is important to realize that in the areas of the material where the laser energy intensity is not high (e.g., the glass volume of workpiece surrounding the central convergence line), the material of the transparent workpiece is largely unaffected by the laser and there is no mechanism for transferring energy from the laser to the material. As a result, nothing happens to the workpiece directly at the focal zone when the laser intensity is below the nonlinear threshold.

Figure 7:
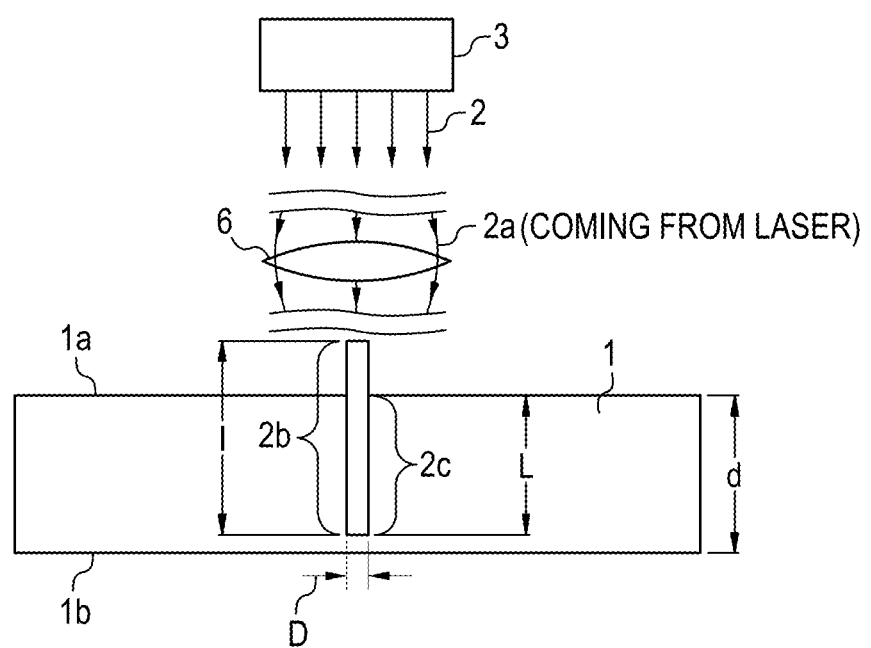
FIG. 7 schematically depicts the positioning of a pulsed laser beam focal line during processing of a transparent workpiece, according to one or more embodiments described herein.

Now referring to FIG. 7, a method for forming a perforated contour line may include focusing a pulsed laser beam 2 from a laser apparatus 3 into a laser beam focal line 2b oriented along the beam propagation direction. As shown in FIG. 7, a laser (not shown) emits laser beam 2, which has a portion 2a incident to the optical assembly 6. The optical assembly 6 turns the incident laser beam into an extensive laser beam focal line 2b on the output side over a defined expansion range along the beam direction (length l of the focal line). The planar workpiece 1 is positioned in the beam path to at least partially overlap the laser beam focal line 2b of pulsed laser beam 2. The laser beam focal line is thus directed into the workpiece 1. Reference 1a designates the surface of the planar workpiece 1 facing the optical assembly 6 or the laser, respectively, and reference 1b designates the reverse surface of workpiece 1. The workpiece 1 has a depth d measured perpendicularly to the planar surfaces 1a and 1b, i.e., to the workpiece plane.

As depicted in FIG. 7, the workpiece 1 is aligned perpendicular to the longitudinal beam axis and thus behind the same focal line 2b produced by the optical assembly 6 (the workpiece 1 is perpendicular to the plane of the drawing). The focal line 2b being oriented or aligned along the beam direction, the workpiece 1 is positioned relative to the focal line 2b such that the focal line 2b starts before the surface 1a of the workpiece 1 and stops before the surface 1b of the workpiece 1 (i.e., focal line 2b terminates within the workpiece 1 and does not extend beyond surface 1b). In the overlapping area of the laser beam focal line 2b with workpiece 1 (i.e., in the workpiece material covered by focal line 2b), the extensive laser beam focal line 2b generates (assuming suitable laser intensity along the laser beam focal line 2b, which intensity is ensured by the focusing of pulsed laser beam 2 on a section of length l, i.e. a line focus of length l) an extensive section 2c (aligned along the longitudinal beam direction) along which an induced absorption is generated in the workpiece material. The induced absorption produces a line defect formation in the workpiece material along section 2c. The line defect is a microscopic (e.g., having an internal diameter of from about 100 nm to about 0.5 microns) elongated defect in the workpiece which may be generated by using a single high energy burst of multiple laser pulses. A series of these line defects creates a non-perforation pattern in the transparent workpiece along the contour line. For example, individual line defects may be created at rates of several hundred kilohertz (i.e., several hundred thousand line defects per second). With relative motion between the focal line 2b and the transparent workpiece 1, these line defects may be placed adjacent to one another (spatial separation varying from sub-micron to many microns as desired). This spatial separation (pitch) may be selected to facilitate separation of the workpiece with a heat source, such as the infrared laser. In some embodiments, the line defect is a "through defect", which is a defect that extends from top surface 1a to bottom surface 1b. The line defect formation is not only local, but over the entire length of the extensive section 2c of the induced absorption. The length of section 2c (which corresponds to the length of the overlapping of laser beam focal line 2b with workpiece 1) is labeled with reference L. The internal diameter of the defect area (i.e., the defect) at the section 2c of the induced absorption is labeled with reference D. This internal diameter D basically corresponds to the average diameter δ of the laser beam focal line 2b, that is, an average spot diameter in a range of between about 0.1 micron and about 5 microns.

Representative optical assemblies 6, which may be applied to generate the focal line 2b, as well as a representative optical setup, in which these optical assemblies may be applied, are described below. All assemblies or setups are based on the description above so that identical references are used for identical components or features or those which are equal in their function. Therefore only the differences are described below.

Figure 8A:
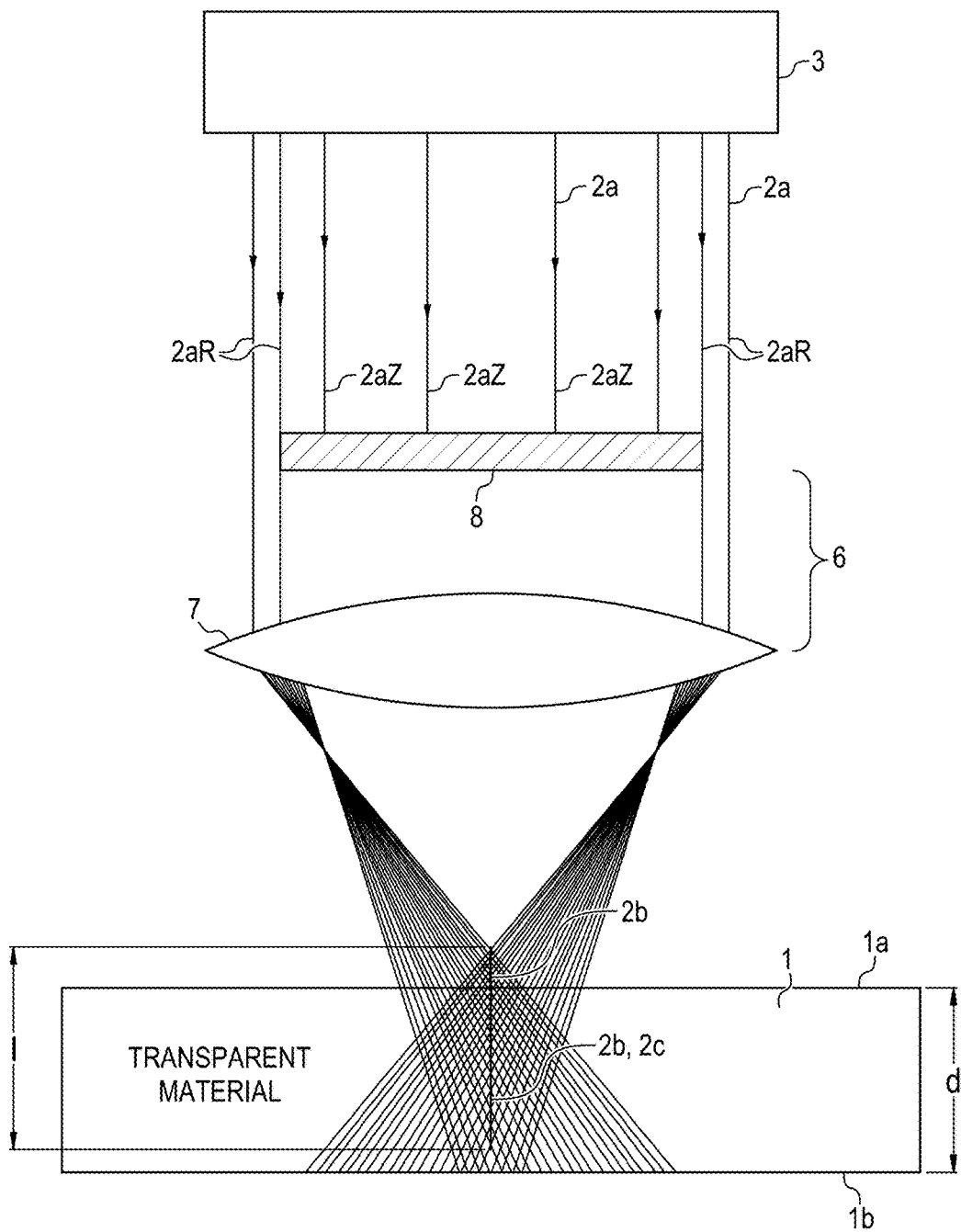
FIG. 8A schematically depicts an optical assembly for pulsed laser processing, according to one embodiment according to one or more embodiments described herein.

According to FIG. 8A, the portion 2a of the laser beam emitted by laser apparatus 3 incident to the optical assembly 6 is first directed onto a circular aperture 8 which is opaque to the wavelength of laser radiation used. Aperture 8 is oriented perpendicular to the longitudinal beam axis and is centered on the central portion of the depicted beam portion 2a. The diameter of aperture 8 is selected in such a way that the laser radiation near the center of beam portion 2a (i.e., the central beam portion, here labeled with 2aZ) hit the aperture and is completely absorbed by it. Only the beams in the outer perimeter range of beam portion 2a (i.e., marginal rays, here labeled with 2aR) are not absorbed by the circular aperture 8 due to the reduced aperture size compared to the beam diameter, and pass aperture 8 laterally and hit the marginal areas of the focusing lens 7 of the optical assembly 6, which, in this embodiment, is designed as a spherically cut, bi-convex lens.

As illustrated in FIG. 8A, the laser beam focal line 2b may not only be a single focal point for the laser beam, but rather a series of focal points for different rays in the laser beam. The series of focal points form an elongated focal line of a defined length, shown in FIG. 8A as the length l of the laser beam focal line 2b. Lens 7 may be centered on the central beam and may be designed as a non-corrected, bi-convex focusing lens in the form of a common, spherically cut lens. As an alternative, aspheres or multi-lens systems deviating from ideally corrected systems, which do not form an ideal focal point but a distinct, elongated focal line of a defined length, may also be used (i.e., lenses or systems which do not have a single focal point). The zones of the lens thus focus along a focal line 2b, subject to the distance from the lens center. The diameter of aperture 8 across the beam direction may be approximately 90% of the diameter of the beam portion 2a (defined by the distance required for the intensity of the beam to decrease to $1/e^2$ of the peak intensity) and approximately 75% of the diameter of the lens 7 of the optical assembly 6. The focal line 2b of a non-aberration-corrected spherical lens 7 generated by blocking out the beam bundles in the center is thus used. FIG. 8A shows a section in one plane through the central beam, and the complete three-dimensional bundle may be seen when the depicted beams are rotated around the focal line 2b.

Figures 1, 8B:
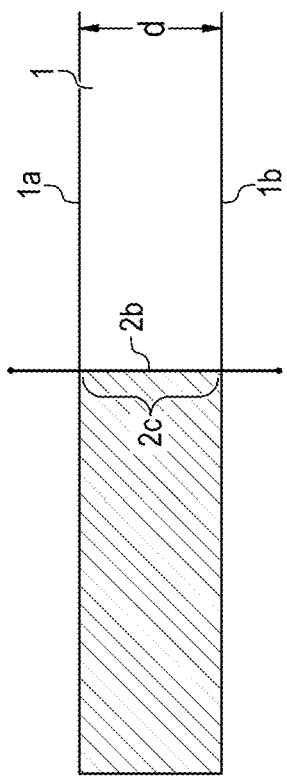
Figures 2, 8B:
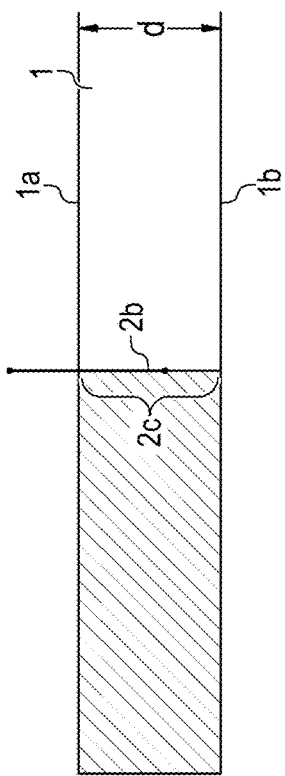
Figures 3, 8B:
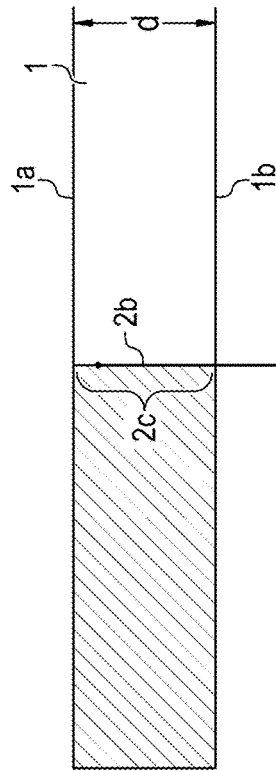
Figures 4, 8B:
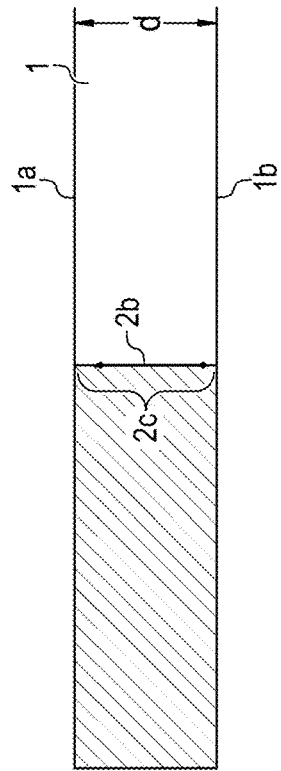

FIG. 8B-1 through FIG. 8B-4 show (not only for the optical assembly in FIG. 8A, but also for any other applicable optical assembly 6) that the position of laser beam focal line 2b may be controlled by suitably positioning and/or aligning the optical assembly 6 relative to workpiece 1 as well as by suitably selecting the parameters of the optical assembly 6. As FIG. 8B-1 illustrates, the length l of the focal line 2b may be adjusted in such a way that it exceeds the workpiece depth d (here by factor 2). If workpiece 1 is placed (viewed in longitudinal beam direction) centrally to focal line 2b, an extensive section of induced absorption 2c may be generated over the entire workpiece thickness. The laser beam focal line 2b may have a length l in a range of from about 0.01 mm to about 100 mm or in a range of from about 0.1 mm to about 10 mm. Various embodiments may be configured to have a focal line 2b with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

In the case shown in FIG. 8B-2, a focal line 2b of length l is generated which generally corresponds to the workpiece depth d. Since workpiece 1 is positioned relative to focal line 2b in such a way that focal line 2b starts at a point outside the workpiece 1, the length L of the extensive section of induced absorption 2c (which extends from the workpiece surface to a defined workpiece depth, but not to the reverse surface 1b) is smaller than the length l of focal line 2b. FIG. 8B-3 shows the case in which the workpiece 1 (viewed along a direction perpendicular to the beam direction) is positioned above the starting point of focal line 2b so that, as in FIG. 8B-2, the length l of focal line 2b is greater than the length L of the section of induced absorption 2c in workpiece 1. The focal line thus starts within the workpiece and extends beyond the reverse surface 1b. FIG. 8B-4 shows the case in which the focal line length l is smaller than the workpiece depth d so that, in the case of a central positioning of the workpiece relative to the focal line viewed in the direction of incidence, the focal line 2b starts near the surface 1a within the workpiece 1 and ends near the surface 1b within the workpiece (e.g., l=0.75·d).

It may be particularly advantageous to position the focal line 2b in such a way that at least one of surfaces 1a, 1b is covered by the focal line (e.g. the setup of FIG. 8B-2 or FIG. 8B-3), so that the section 2c of induced absorption starts at least on one surface of the workpiece. In this way it is possible to achieve virtually ideal cuts while avoiding ablation, feathering, and particulation at the surface.

Figure 9:
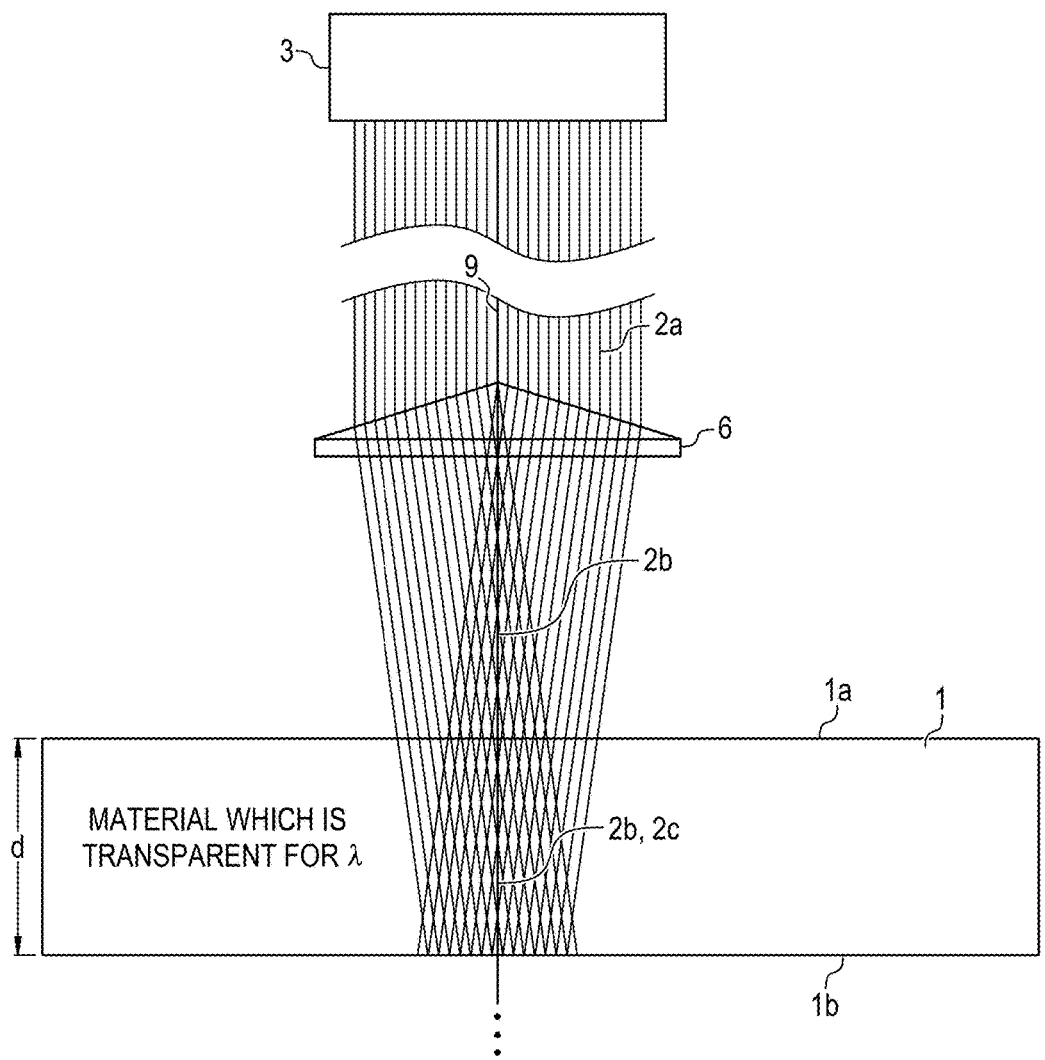
FIG. 9 schematically depicts another embodiment of an optical assembly for pulsed laser processing, according to one or more embodiments described herein.

FIG. 9 depicts another embodiment of an optical assembly 6. The basic construction follows the one described in FIG. 8A so that only the differences are described below. The depicted optical assembly in FIG. 9 utilizes optics with a non-spherical free surface in order to generate the focal line 2b, which is shaped in such a way that a focal line of defined length l is formed. For this purpose, aspheres may be used as optic elements of the optical assembly 6. In FIG. 9, for example, a so-called conical prism, also referred to as axicon, is used. An axicon is a conically cut lens which forms a spot source on a line along the optical axis (or transforms a laser beam into a ring). The cone angle of the axicon in the example is approximately 10°. However, it should be understood that other ranges of the axicon cone angle may also be utilized. The apex of the axicon 9 is directed towards the incidence direction and centered on the beam center. Since the focal line 2b produced by the axicon 9 starts within the interior of the axicon, workpiece 1 (here aligned perpendicularly to the main beam axis) may be positioned in the beam path directly behind axicon 9. As FIG. 9 shows, it is also possible to shift workpiece 1 along the beam direction due to the optical characteristics of the axicon while remaining within the range of focal line 2b. The section of the induced absorption 2c in the material of workpiece 1 therefore extends over the entire workpiece depth d. However, the depicted layout may be subject to the following restrictions: since the region of focal line 2b formed by axicon 9 begins within axicon 9, a significant part of the laser energy is not focused into the section of induced absorption 2c of focal line 2b, which is located within the material, in the situation where there is a separation between axicon 9 and the workpiece. Furthermore, length l of focal line 2b is related to the beam diameter through the refractive indices and cone angles of axicon 9. This is why, in the case of relatively thin materials (e.g., several millimeters), the total focal line is much longer than the thickness of the workpiece, having the effect that much of the laser energy is not focused in the thickness of the material.

Figure 10A:
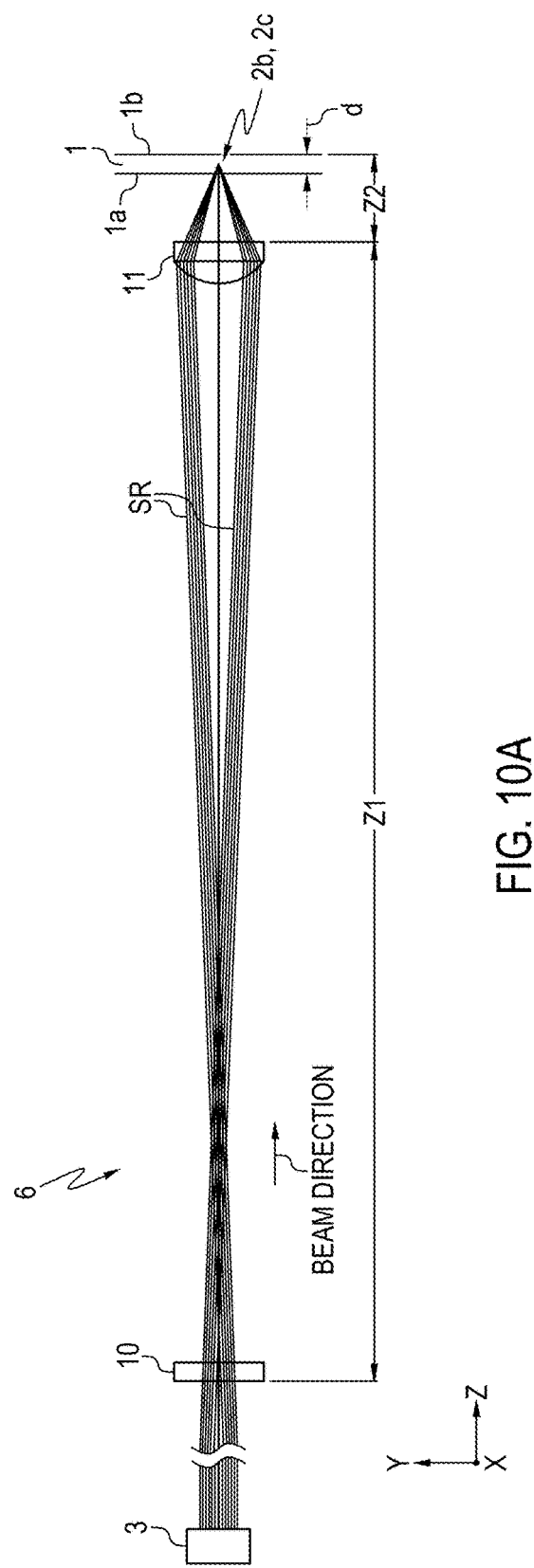
FIG. 10A schematically depicts another embodiment of an optical assembly for pulsed laser processing, according to one or more embodiments described herein.

For this reason, it may be desirable to use an optical assembly 6 that includes both an axicon and a focusing lens. FIG. 10A depicts such an optical assembly 6 in which a first optical element with a non-spherical free surface designed to form an extensive laser beam focal line 2b is positioned in the beam path from laser apparatus 3. In the case shown in FIG. 10A, this first optical element is an axicon 10 with a cone angle of 5° positioned perpendicularly to the beam direction and centered on beam from laser apparatus 3. The apex of the axicon 10 is oriented towards the beam direction. A second, focusing optical element, here the plano-convex lens 11 (the curvature of which is oriented towards the axicon), is positioned in the beam direction at a distance z1 from the axicon 10. The distance z1 may be approximately 300 mm and is selected such that the laser radiation formed by axicon 10 is circularly incident on the outer radial portion of lens 11. Lens 11 focuses the circular radiation on the output side at a distance Z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 10B:
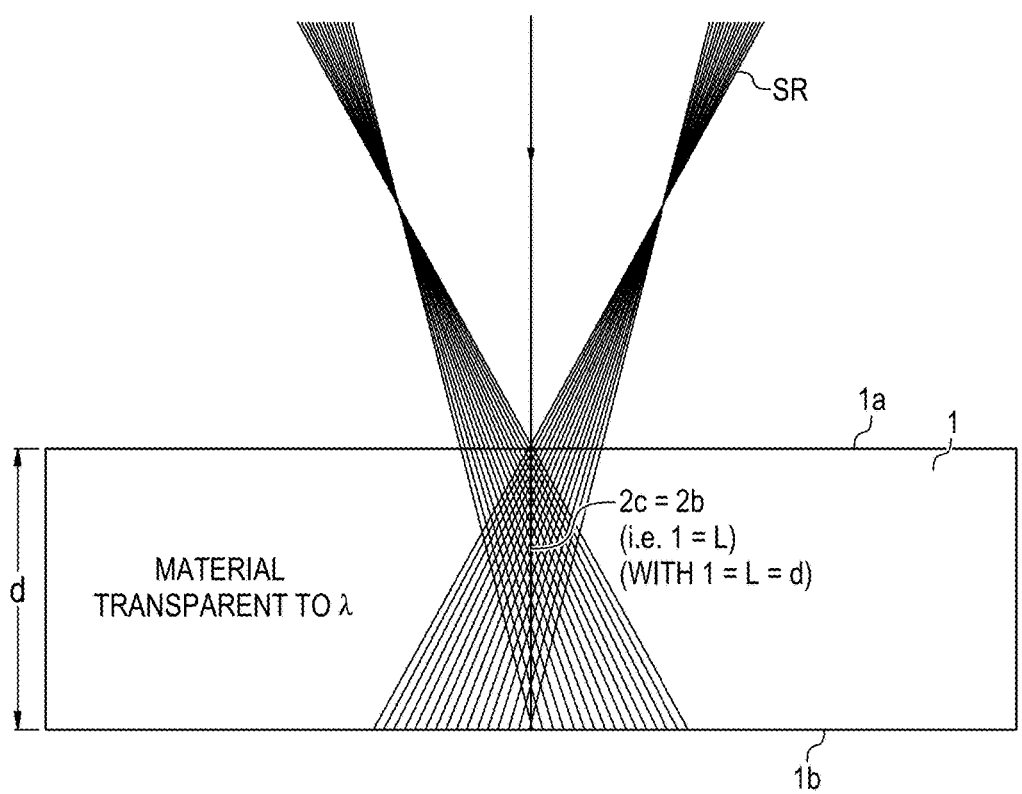
FIG. 10B schematically depicts a detailed view of the pulsed laser of FIG. 10A at the transparent workpiece, according to one or more embodiments described herein.

FIG. 10B depicts the formation of the focal line 2b or the induced absorption 2c in the material of workpiece 1 according to the optical assembly 6 of FIG. 10A. The optical characteristics of both elements 10, 11 as well as their positioning is selected such that the length l of the focal line 2b in the beam direction is the same as the depth d of workpiece 1. In some embodiments, an exact positioning of workpiece 1 along the beam direction may be necessary in order to position the focal line 2b exactly between the two surfaces 1a and 1b of workpiece 1, as shown in FIG. 10B.

In another embodiment, instead of the plano-convex lens depicted in FIG. 10A, it is also possible to use a focusing meniscus lens or another higher-order corrected focusing lens (e.g., an asphere, multi-lens system).

In order to generate relatively short focal lines 2b using the combination of an axicon and a lens depicted in FIG. 10A, it may be necessary to select a very small beam diameter of the laser beam incident on the axicon. This has the practical disadvantage that the centering of the beam onto the apex of the axicon must be very precise and that the result is very sensitive to directional variations of the laser such as beam drift stability. Furthermore, a tightly collimated laser beam may be highly divergent, that is the beam bundle may become blurred over short distances due to light deflection.

Figure 11:
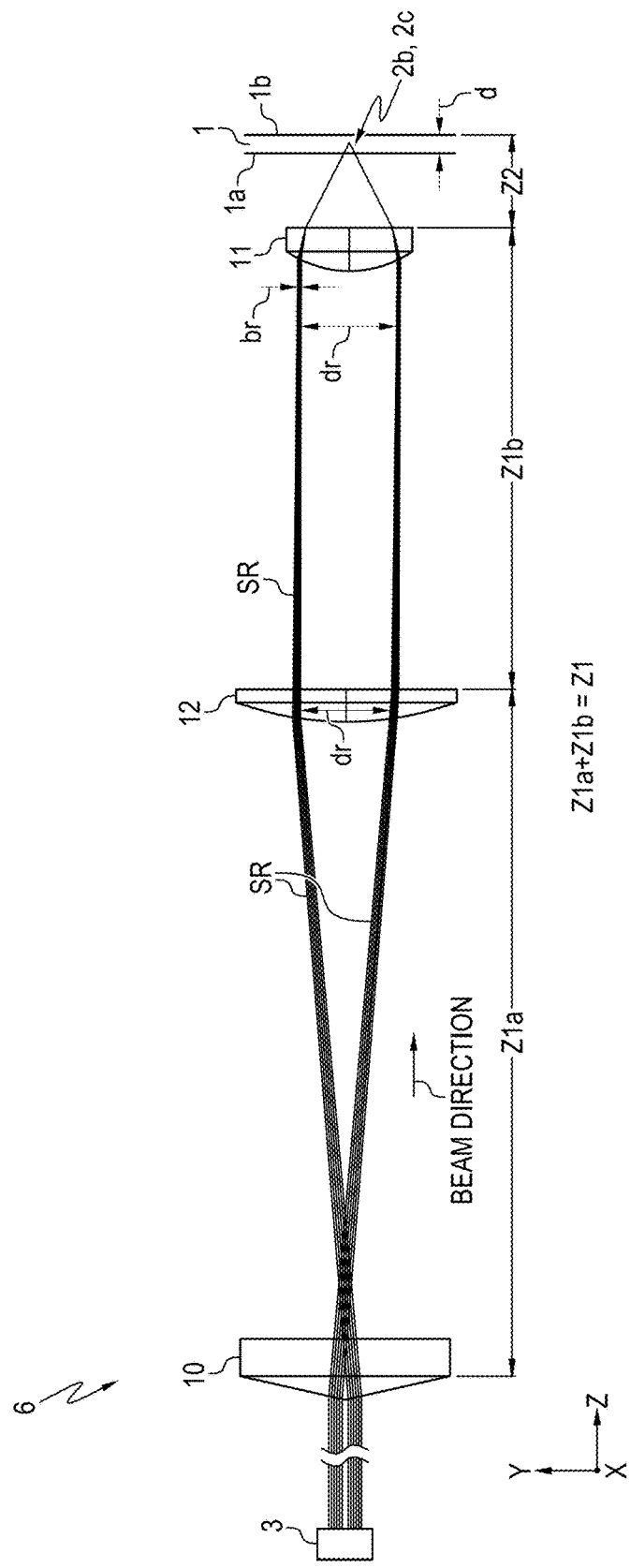
FIG. 11 schematically depicts another embodiment of an optical assembly for pulsed laser processing, according to one or more embodiments described herein.

As shown in FIG. 11, both effects may be avoided by including another lens, a collimating lens 12, in the optical assembly 6. The additional collimating lens 12 serves to tightly adjust the circular illumination of focusing lens 11. The focal length f' of collimating lens 12 is selected such that the desired circle diameter dr results from the distance z1a from the axicon to the collimating lens 12, which is equal to f'. The desired width br of the ring may be adjusted via the distance z1b between the collimating lens 12 and the focusing lens 11. As a matter of pure geometry, the small width of the circular illumination leads to a short focal line. A minimum may be achieved at distance f'.

The optical assembly 6 depicted in FIG. 11 is thus based on the one depicted in FIG. 10A so that only the differences are described below. The collimating lens 12, here also designed as a plano-convex lens with its curvature towards the beam direction is placed centrally in the beam path between axicon 10 (with its apex towards the beam direction) on one side and the plano-convex lens 11 on the other side. The distance between the collimating lens 12 from axicon 10 is referred to as z1a, the distance between the focusing lens 11 from collimating lens 12 is z1b, and the distance of the focal line 2b from the focusing lens 11 is z2. As shown in FIG. 11, the circular radiation SR formed by axicon 10, which is incident divergently and under the circle diameter dr on the collimating lens 12, is adjusted to the required circle width br along the distance z1b for an approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line l of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

Figure 12C:
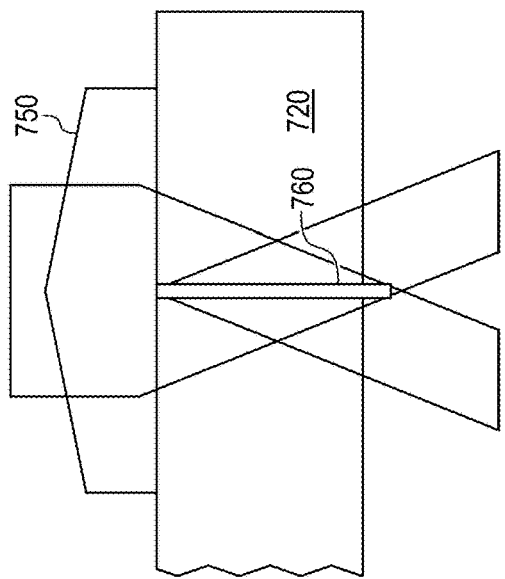
FIG. 12C schematically depicts an intensity regime for a condensed pulsed laser beam with an axicon or diffractive Fresnel lens, according to one or more embodiments described herein.
Figure 12B:
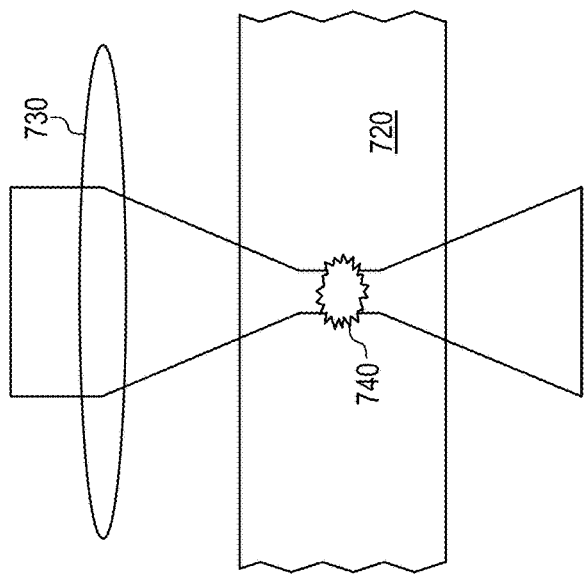
FIG. 12B schematically depicts an intensity regime for a condensed pulsed laser beam with a spherical lens, according to one or more embodiments described herein.
Figure 12A:
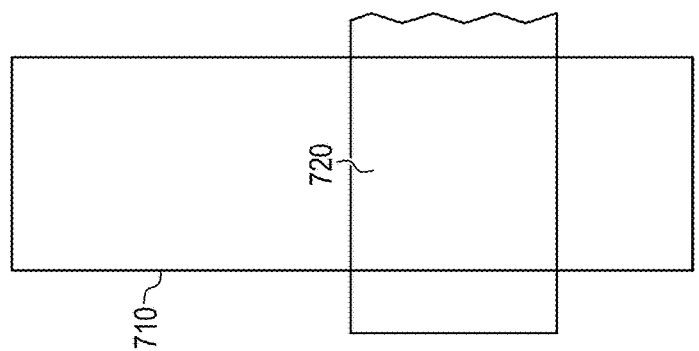
FIG. 12A schematically depicts an intensity regime for an unfocused pulsed laser beam, according to one or more embodiments described herein.

FIGS. 12A-12C illustrate the laser-matter interaction at different laser intensity regimes. In the first case, shown in FIG. 12A, the unfocused pulsed laser beam 710 goes through a transparent workpiece 720 without introducing any modification to the workpiece 720. In this particular case, the nonlinear effect is not present because the laser energy density (or laser energy per unit area illuminated by the beam) is below the threshold necessary to induce nonlinear effects. The higher the energy density, the higher the intensity of the electromagnetic field. Therefore, as shown in FIG. 12B, when the laser beam is focused by spherical lens 730 to a smaller spot size, the illuminated area is reduced and the energy density increases, triggering the nonlinear effect that modifies the transparent material to permit formation of a fault line only in the volume where that condition is satisfied. In this way, if the beam waist of the focused laser is positioned at the surface of the workpiece, modification of the surface will occur. In contrast, if the beam waist of the focused laser is positioned below the surface of the workpiece, nothing happens at the surface when the energy density is below the threshold of the nonlinear optical effect. However, when the focal point 740 is positioned in the bulk of the workpiece 720, the laser intensity is high enough to trigger multi-photon non-linear effects, thus inducing damage to the material. In another embodiment, as shown in FIG. 12C in the case of an axicon, the diffraction pattern of an axicon lens 750, or alternatively a Fresnel axicon, creates interference that generates a Bessel-shaped intensity distribution (i.e., the high intensity cylinder 760) and only in that volume is the intensity sufficient to create nonlinear absorption and modification of the material 720. The diameter of cylinder 760 in which the Bessel-shaped intensity distribution is sufficient to create nonlinear absorption and modification to the material is also the spot diameter of the laser beam focal line. Spot diameter D of a Bessel beam may be expressed as $D=(2.4048\lambda)/(2\pi B)$, where $\lambda$ is the laser beam wavelength and B is a function of the axicon angle.

For the purpose of cutting alkaline earth boro-aluminosilicate glass compositions, according to some exemplary embodiments, a picosecond pulsed laser (e.g., a 1064 nm, or 532 nm picosecond pulsed laser) which produces bursts of multiple pulses in combination with line-focus beam forming optics may be used to line defects in the glass composition. However, it is noted that other pulsed lasers may also be utilized in the perforation processes described herein.

For example, a display/TFT glass composition with a thickness of up to 0.7 mm may be positioned so that it is within the region of the focal line produced by the optics. With a focal line of about 1 mm in length, a 1064 nm picosecond laser that produces output power of about 24 W or more at a burst repetition rate of 200 kHz (about 120 μJ/burst or more) measured at the transparent workpiece, the optical intensities in the focal line region may be sufficient to create non-linear absorption in the glass composition. The pulsed laser beam may have an average laser burst energy measured, at the material, greater than 40 μJ per mm of thickness of the workpiece. For some glasses, the average laser burst energy utilized may be as great as 2500 μJ per mm of thickness of the material, for example from about 40 μJ/mm to about 2500 μJ/mm, from about 400 μJ/mm to about 1300 μJ/mm, or from about 550 μJ/mm to about 1000 μJ/mm, because the energy density is sufficient to make a thorough damage track of line defects in the workpiece while minimizing the extent of micro cracking orthogonal to the perforated line or cut edge. This "average pulse burst laser energy" per mm may also be referred to as an average per-burst linear energy density, or an average energy per laser pulse burst per mm of thickness of the material. A region of damaged, ablated, vaporized, or otherwise modified material within the glass composition may be created that approximately follows the linear region of high optical intensity created by the laser beam focal line.

Now referring to FIGS. 13A and 13B, it should be understood that the typical operation of such a picosecond laser described herein creates a burst 500 of pulses 500A. Each burst 500 contains multiple individual pulses 500A (such as at least two pulses, at least 5 pulses, at least 7 pulses, at least 8 pulses, at least 9 pulses, at least 10 pulses, at least 15 pulses, at least 20 pulses, or even more pulses) of very short duration. That is, a burst is a group of pulses, and the bursts are separated from one another by a longer duration than the separation of individual adjacent pulses within each burst. According to one or more embodiments, for cutting or perforating display glass/TFT glass compositions, the number of pulses per burst may be from about 1 to 30 (such as from 5 to 20). Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or any range therebetween). The energy or intensity of each individual pulse 500A within the burst may not be equal to that of other pulses within the burst, and the intensity distribution of the multiple pulses within a burst 500 often follows an exponential decay in time governed by the laser design. In some embodiments, each pulse 500A within the burst 500 of the exemplary embodiments described herein is separated in time from the subsequent pulse in the burst by a duration $T_p$ of from about 1 nsec to about 50 nsec (e.g., from about 10 nsec to about 50 nsec, or from about 10 nsec to about 30 nsec, with the time often governed by the laser cavity design). For a given laser, the time separation $T_p$ between adjacent pulses within a burst 500 may be relatively uniform (e.g., within about 10% of one another). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each burst of pulses (i.e., the time separation $T_b$ between bursts) will be much longer. For example, the time between each burst of pulses may be from about 0.25 microseconds to about 1000 microseconds, e.g., from about 1 microsecond to about 10 microseconds, or from about 3 microseconds to about 8 microseconds. In some of the exemplary embodiments of the laser described herein, the time separation $T_b$ is about 5 microseconds for a laser with a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and preferably $T_d$≤15 psec) of high intensity have been shown to work particularly well.

The energy required to modify the material may be described in terms of the burst energy (i.e., the energy contained within a burst where each burst 500 contains a series of pulses 500A), or in terms of the energy contained within a single laser pulse (many of which may comprise a burst). The energy per burst may be from about 25 μJ to about 750 μJ, e.g., from about 50 μJ to about 500 μJ, or from about 50 μJ to about 250 μJ. For some glass compositions, the energy per burst may be from about 100 μJ to about 250 μJ. However, for display or TFT glass compositions, the energy per burst may be higher (e.g., from about 300 μJ to about 500 μJ, or from about 400 μJ to about 600 μJ, depending on the specific display/TFT glass composition of the workpiece). The energy of an individual pulse within the burst will be less, and the exact individual laser pulse energy will depend on the number of pulses 500A within the burst 500 and the rate of decay (e.g., exponential decay rate) of the laser pulses with time as shown in FIGS. 13A and 13B. For example, for a constant energy/burst, if a pulse burst contains 10 individual laser pulses 500A, then each individual laser pulse 500A will contain less energy than if the same burst 500 had only 2 individual laser pulses.

The use of a pulsed laser beam capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst 500 allows access to larger timescales of high intensity interaction with the material than is possible with single-pulse lasers. While a single-pulse may be expanded in time, the intensity within the pulse is reduced as roughly one over the pulse width. Therefore, if a 10 psec single pulse is expanded to a 10 nsec pulse, the intensity is reduced by roughly three orders of magnitude. Such a reduction may reduce the optical intensity to the point where non-linear absorption is no longer significant, and light-material interaction is no longer sufficient for cutting. In contrast, with a pulse burst laser, the intensity during each pulse 500A within the burst 500 may remain relevantly high (for example, three 10 psec pulses 500A spaced apart in time by approximately 10 nsec still allows the energy within each pulse burst to be approximately three times higher than that of a single 10 psec pulse) and the laser interacts with the material over a timescale that is three orders of magnitude larger. For example, often 10 psec pulses 500A spaced apart in time by approximately 10 nsec results in the energy within each pulse burst to be approximately ten times higher than that of a single 10 psec pulse and the laser interacts with the material over a timescale that is now orders of magnitude larger. In one embodiment, the required amount of burst energy to modify the material will depend on the workpiece material composition and the length of the line focus used to interact with the workpiece. The longer the interaction region, the more the energy is spread out, and higher burst energy will be required. The exact timing, pulse duration, and burst repetition rates may vary depending on the laser design, but short pulses times (e.g., less than about 15 psec, or even less than or equal to about 10 psec) of high intensity pulses may be exemplary in some embodiments. A defect is formed in the material when a single burst of pulses strikes essentially the same location on the transparent workpiece. That is, multiple laser pulses within a single burst correspond to a single line defect in the transparent workpiece. Since the workpiece is translated (e.g., by a constantly moving stage or the beam moved relative to the workpiece), the individual pulses within the burst cannot be at exactly the same spatial location on the glass. However, the individual pulses may be within 1 μm of one another (i.e., they effectively strike the glass at essentially the same location). For example, the pulses may strike the glass at a spacing, sp, from one another where 0<sp≤500 nm. When, for example, a glass location is hit with a burst of 20 pulses the individual pulses within the burst strike the glass within 250 nm of each other. Thus, in some embodiments 1 nm<sp<250 nm. In some embodiments 1 nm<sp<100 nm.

In one or more embodiments, for the purposes of cutting or separating the workpiece, pulse burst energy may be from about 100 μJ to about 600 μJ per burst, such as from about 300 μJ to about 600 μJ per burst. Working outside this range may result in successful separation of other glasses, but not display (or TFT) glass compositions. For some display glass types the pulse burst energy may be from about 300 μJ to about 500 μJ, or for other display type glass from about 400 μJ to about 600 μJ. A pulse burst energy of 400 μJ to 500 μJ may work well for many display type glass compositions. Energy density within the line focus may be optimized for specific display or TFT glasses. For example, for both EAGLE XG and CONTEGO glasses, a suitable range for the pulse burst energy may be from about 300 to about 500 μJ and the line focus may be from about 1.0 mm to about 1.4 mm (where the line focus length is determined by the optical configuration).

In one or more embodiments, relatively low pulsed laser energy densities (e.g., below 300 μJ) may form perforations which do not form as desired, causing the fracture between defects to not readily materialize during infrared laser processing, leading to increased break resistance (also referred to herein as a break strength) in display glass. If the energy density of the pulsed laser beam is too high (e.g., greater than or equal to 600 μJ, or even greater than 500 μJ) the heat damage may be greater, causing the crack connecting the perforation to stray and not form along the desired path and the break resistance (break strength) of the display (or TFT) glass to dramatically increase.

In view of the foregoing description, it should be understood that laser separation by infrared laser beam may be enhanced by utilizing an infrared laser beam which projects maximum intensity over the areas adjacent a contour line containing defects rather than directly onto the contour line. In one embodiment, an annular beam profile may be utilized to achieve this infrared laser maximum power projection adjacent the contour line.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for laser processing a workpiece, the method comprising:
    forming a contour line in the workpiece, the contour line comprising defects in the workpiece; and
    directing an infrared laser beam onto the workpiece along or near the contour line to separate the workpiece along the contour line, wherein the infrared laser beam has an annular beam profile such that a greater distribution of cumulated energy from the infrared laser beam is located in areas adjacent to the contour line than directly on the contour line.

2. The method of claim 1, wherein an outer diameter of the annular beam profile is from about 0.5 mm to about 20 mm.

3. The method of claim 2, wherein an inner diameter of the annular beam profile is from about 5% to about 95% of the outer beam diameter.

4. The method of claim 1, wherein a greater distribution of cumulated energy from the infrared laser beam is located in areas adjacent to the contour line on both sides of the contour line than directly on the contour line.

5. The method of claim 1, wherein the infrared laser beam is centered on the contour line.

6. The method of claim 1, wherein the infrared laser beam is produced by a carbon dioxide laser, a carbon monoxide laser, a solid state laser, a laser diode, or combinations thereof.

7. The method of claim 1, wherein the workpiece comprises an alkaline earth boroaluminosilicate glass, sapphire, fused silica, or combinations thereof.

8. The method of claim 1, wherein the infrared laser beam and the workpiece are translated relative to one another at a speed from about 1 mm/s to about 10 m/s.

9. The method of claim 1, wherein the infrared laser beam has a power of from about 20 W to about 1000 W.

10. The method of claim 1, wherein the workpiece has a CTE of less than or equal to about $5 \times 10^{-6}$/K.

11. The method of claim 1, wherein workpiece has a thickness of from about 50 microns to about 10 mm.

12. The method of claim 1, wherein forming the contour line comprises:
    focusing a pulsed laser beam into a pulsed laser beam focal line oriented along a beam propagation direction and directed into the workpiece, the pulsed laser beam focal line generating an induced absorption within the workpiece, and the induced absorption producing a line defect along the pulsed laser beam focal line within the workpiece;
    translating the workpiece and the pulsed laser beam focal line relative to each other along the contour line, thereby laser forming a plurality of line defects along the contour line within the workpiece, wherein a spacing between adjacent line defects is from 1 microns to 30 microns; and
    wherein the pulsed laser produces pulse bursts with from about 1 pulse per pulse burst to about 30 pulses per pulse burst and the pulse burst energy is from about 100 µJ to about 600 µJ per pulse burst.

13. The method of claim 12, wherein the pulsed laser beam produces pulse bursts with from about 9 pulses per pulse burst to about 20 pulses per pulse burst, and the pulse burst energy is from about 300 gj per pulse burst to about 500 gj per pulse burst.

14. The method according to claim 12, wherein:
    the spacing between adjacent line defects is from about 7 microns to about 12 microns; and
    the pulsed laser beam produces pulse bursts with from about 5 pulses per pulse burst to about 15 pulses per pulse burst, and the pulse burst energy is from about 400 pJ per pulse burst to about 600 micro Joules per pulse burst.

15. The method according to claim 12, wherein the pulses of the pulse bursts have a duration of from about 1 picosecond to about 100 picoseconds.

16. The method according to claim 12, wherein the pulse bursts have a repetition rate in a range of from about 10 kHz and about 3 MHz.

17. The method according to claim 12, wherein the pulsed laser beam focal line has an average spot diameter in a range of from about 0.1 micron to about 10 microns.

18. A method for laser processing a workpiece, the method comprising:
    focusing a pulsed laser beam into a pulsed laser beam focal line directed into the workpiece, the pulsed laser beam focal line producing a line defect within the workpiece;
    translating the workpiece and the pulsed laser beam focal line relative to each other thereby laser forming a plurality of line defects along a contour line within the workpiece, wherein a spacing between adjacent line defects is from 5 microns to 15 microns; and
    directing an infrared laser beam onto the workpiece along or near the contour line to separate the workpiece along the contour line, wherein the infrared laser beam has a beam profile such that a greater distribution of cumulated energy from the infrared laser beam is located in areas adjacent to the contour line on both sides of the contour line than directly on the contour line.

19. The method of claim 18, wherein the infrared laser beam has an annular beam profile and is centered on the contour line.

20. The method of claim 18, wherein the infrared laser beam is produced by a carbon dioxide laser, a carbon monoxide laser, a solid state laser, a laser diode, or combinations thereof.

* * * * *

UNITED STATES PATENT AND TRADEMARK OFFICE
CERTIFICATE OF CORRECTION

PATENT NO. : 10,377,658 B2  
APPLICATION NO. : 15/657320  
DATED : August 13, 2019  
INVENTOR(S) : Daniel Schnitzler et al.

Page 1 of 2

It is certified that error appears in the above-identified patent and that said Letters Patent is hereby corrected as shown below:

On the Title Page

On page 4, Column 2, item (56), other publications, Line 1, delete "EagleEtch" and insert -- EagleTech --, therefor.

On page 4, Column 2, item (56), other publications, Line 1, delete "EuropeTec" and insert -- EuropTec --, therefor.

On page 4, Column 2, item (56), other publications, Line 15, delete "Proccessing" and insert -- Processing --, therefor.

On page 4, Column 2, item (56), other publications, Line 20, delete "B (2007)" and insert -- B88 (2007) --, therefor.

On page 5, Column 1, item (56), other publications, Line 1, delete ""Coming®" and insert -- "Corning® --, therefor.

On page 5, Column 1, item (56), other publications, Line 3, delete ""Coming®" and insert -- "Corning® --, therefor.

On page 5, Column 1, item (56), other publications, Line 56, delete "Joumal" and insert -- Journal --, therefor.

On page 5, Column 2, item (56), other publications, Line 7, delete "pluse" and insert -- pulse --, therefor.

On page 5, Column 2, item (56), other publications, Line 30, delete "micro-achitecture," and insert -- micro-architecture, --, therefor.

Signed and Sealed this  
Twenty-fifth Day of February, 2020

Andrei Iancu  
*Director of the United States Patent and Trademark Office*

CERTIFICATE OF CORRECTION (continued)
U.S. Pat. No. 10,377,658 B2

On page 5, Column 2, item (56), other publications, Line 42, delete ""Theoryof" and insert -- "Theory of --, therefor.

On page 5, Column 2, item (56), other publications, Line 64, delete "Egineering" and insert -- Engineering --, therefor.

In the Claims

In Column 24, Line 26, Claim 13, delete "300 gj" and insert -- 300 µJ --, therefor.

In Column 24, Line 27, Claim 13, delete "500 gj" and insert -- 500 µJ --, therefor.

In Column 24, Line 35, Claim 14, delete "400 pJ" and insert -- 400 µJ --, therefor.